(12) United States Patent
Beekman et al.

(10) Patent No.: US 8,907,270 B2
(45) Date of Patent: Dec. 9, 2014

(54) METHOD AND APPARATUS FOR GAIN REGULATION IN A GAMMA DETECTOR

(75) Inventors: Sicco Beekman, Houston, TX (US); Tong Zhou, Sugar Land, TX (US); Christian Stoller, Princeton Junction, NJ (US); Fabien Haranger, Le Plessis-Robinson (FR)

(73) Assignee: Schlumberger Technology Corporation, Sugar Land, TX (US)

(*) Notice: Subject to any disclaimer, the term of this patent is extended or adjusted under 35 U.S.C. 154(b) by 214 days.

(21) Appl. No.: 13/304,381

(22) Filed: Nov. 24, 2011

(65) Prior Publication Data

US 2013/0134304 A1    May 30, 2013

Related U.S. Application Data

(63) Continuation-in-part of application No. PCT/US2011/041929, filed on Jun. 26, 2011.

(60) Provisional application No. 61/360,345, filed on Jun. 30, 2010.

(51) Int. Cl.
   *G01V 5/10* (2006.01)

(52) U.S. Cl.
   USPC ............................................. 250/269.6

(58) Field of Classification Search
   USPC ............................................. 250/269.6
   See application file for complete search history.

(56) References Cited

U.S. PATENT DOCUMENTS

| | | | |
|---|---|---|---|
| 3,767,921 A * | 10/1973 | Jones | 250/261 |
| 3,939,343 A | 2/1976 | Schultz et al. | |
| 4,464,569 A | 8/1984 | Flaum | |
| 4,766,543 A * | 8/1988 | Schmidt | 702/8 |
| 5,360,975 A | 11/1994 | Stoller | |
| 5,406,078 A | 4/1995 | Jacobson | |
| 5,420,422 A | 5/1995 | Loomis | |
| 5,475,727 A | 12/1995 | Buchanan et al. | |
| 5,600,135 A * | 2/1997 | Jacobson | 250/261 |
| 5,608,215 A | 3/1997 | Evans | |
| 5,804,820 A | 9/1998 | Evans et al. | |
| 6,389,367 B1 * | 5/2002 | Plasek | 702/104 |
| 7,073,378 B2 | 7/2006 | Smits et al. | |

(Continued)

FOREIGN PATENT DOCUMENTS

EP    0640848 B1   6/1998
WO    2010/135618  11/2010

OTHER PUBLICATIONS

G.F. Knoll, "Radiation Detection and Measurement", John Wiley & Sons, Inc., 2000.

(Continued)

*Primary Examiner* — Christine Sung
(74) *Attorney, Agent, or Firm* — Cathy Hewitt

(57) ABSTRACT

Methods and systems to determine and regulate the gain of gamma-ray detectors in tools equipped with neutron sources are provided. Gain regulation may be based on the gamma ray background generated in the tool by interaction of neutrons with the nuclei of some elements constituting the tool structure. Some chemical elements that are used in construction of the tool's mechanical parts and structure result in characteristic gamma ray lines in a measured energy spectrum. These lines can be used to calibrate the energy scale of the response of the detector, without any added calibration radio isotopic source.

26 Claims, 14 Drawing Sheets

(56) References Cited

U.S. PATENT DOCUMENTS

| | | |
|---|---|---|
| 7,081,616 B2 | 7/2006 | Grau et al. |
| 7,202,456 B2 | 4/2007 | Mickael |
| 7,253,401 B2 | 8/2007 | Mickael et al. |
| 7,365,307 B2 | 4/2008 | Stoller et al. |
| 7,446,308 B2 | 11/2008 | Gilchrist et al. |
| 2006/0138340 A1 | 6/2006 | Ianakiev et al. |
| 2007/0284518 A1* | 12/2007 | Randall .................. 250/261 |
| 2008/0067394 A1 | 3/2008 | Feller et al. |
| 2009/0294686 A1 | 12/2009 | Chandrasekharan |
| 2010/0243877 A1 | 9/2010 | Berheide et al. |
| 2010/0332176 A1 | 12/2010 | Roberts |
| 2012/0197529 A1 | 8/2012 | Stephenson et al. |

OTHER PUBLICATIONS

International Search Report and Written Opinion for International Application No. PCT/US2012/066182 dated Mar. 14, 2013.

* cited by examiner

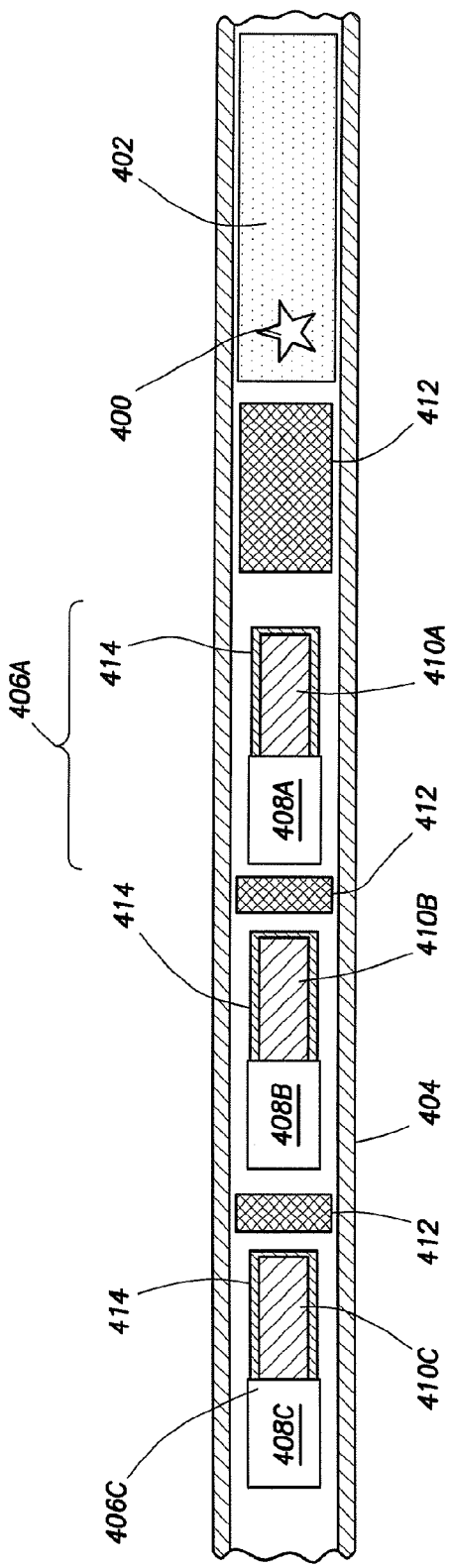
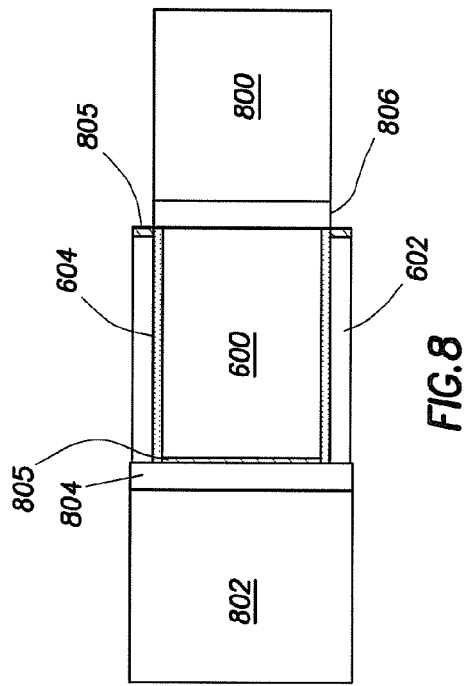

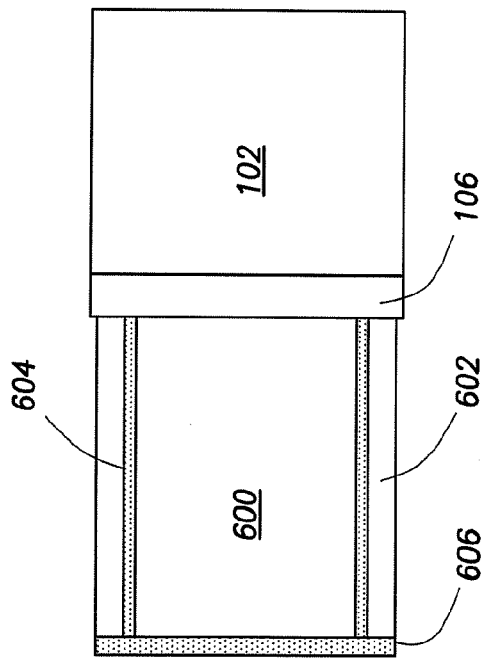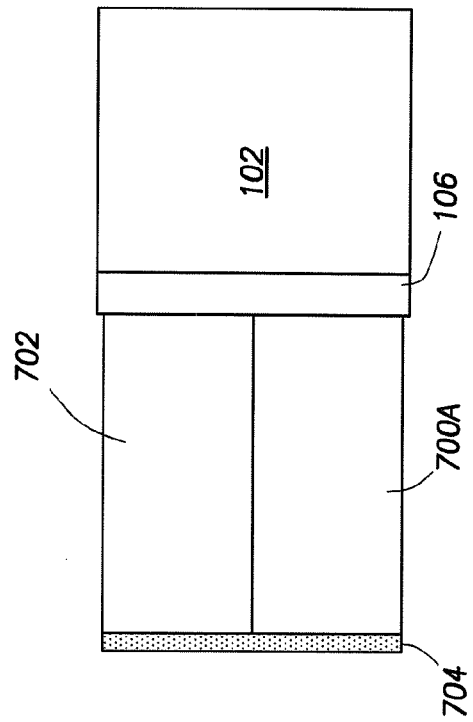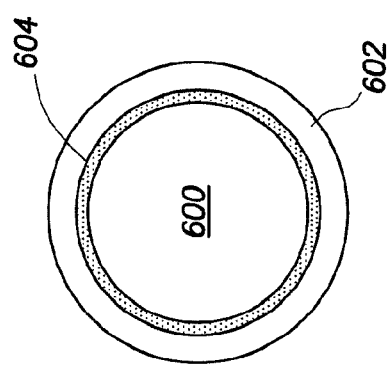

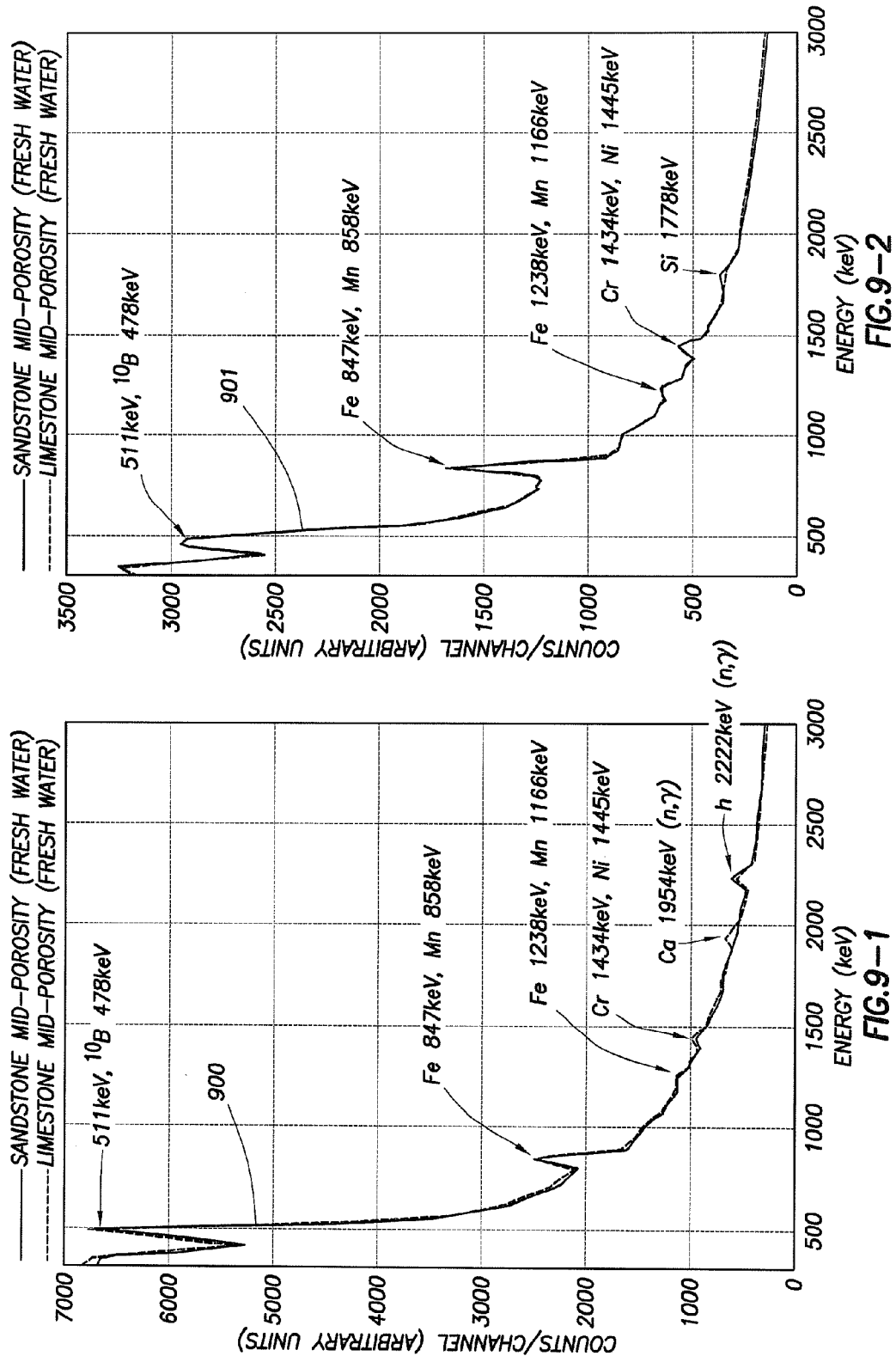

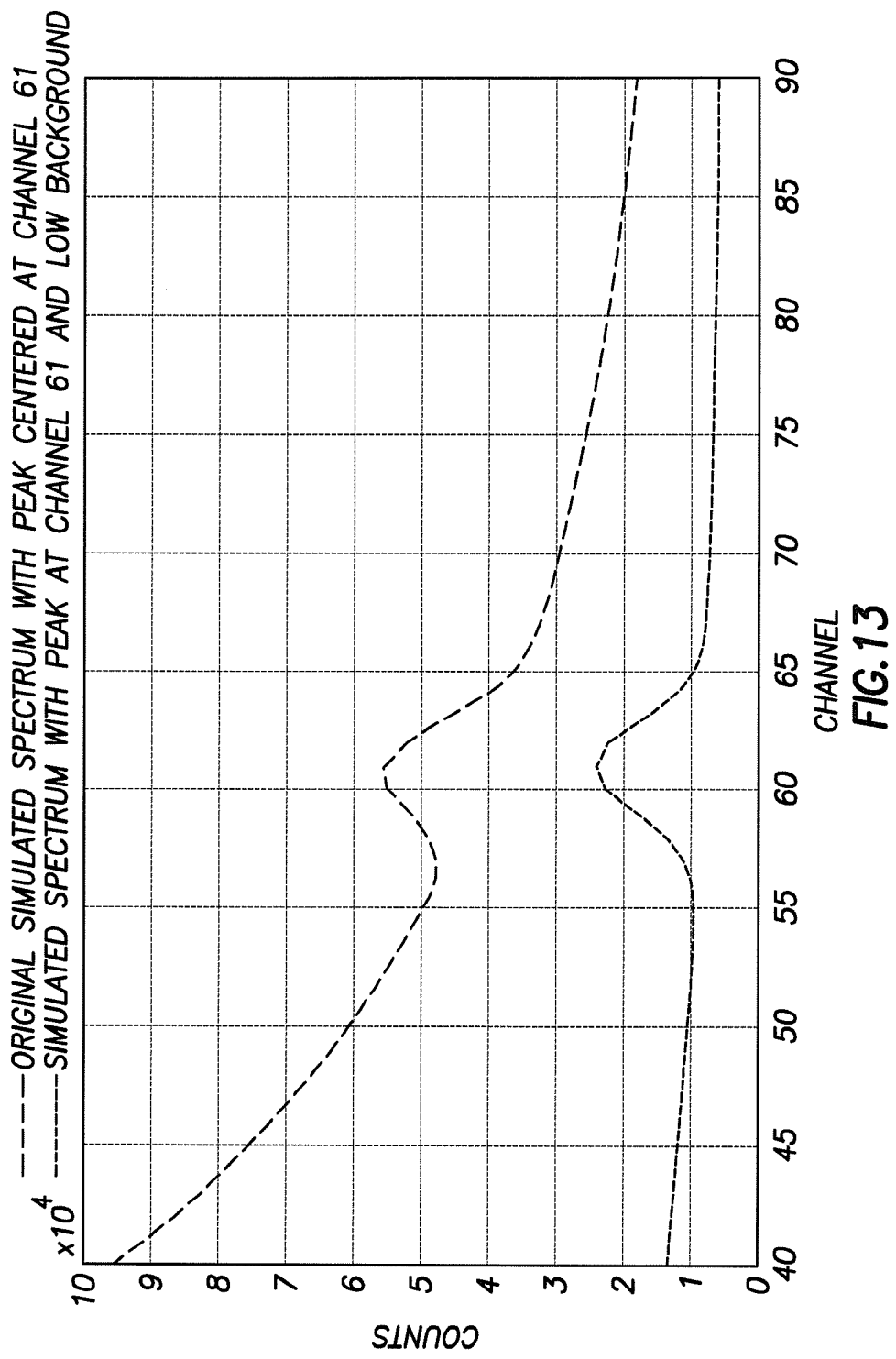

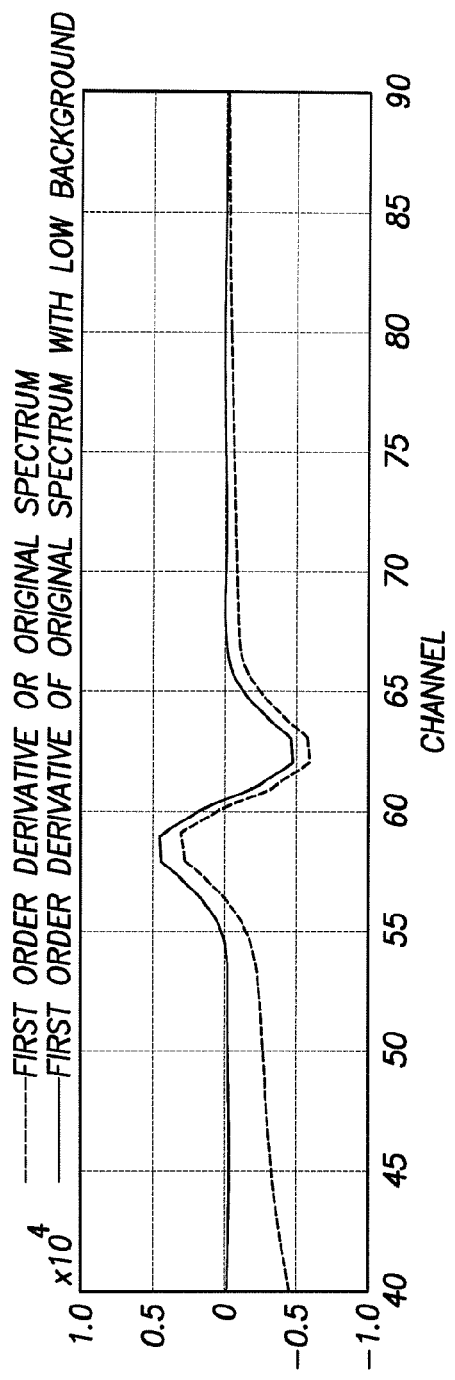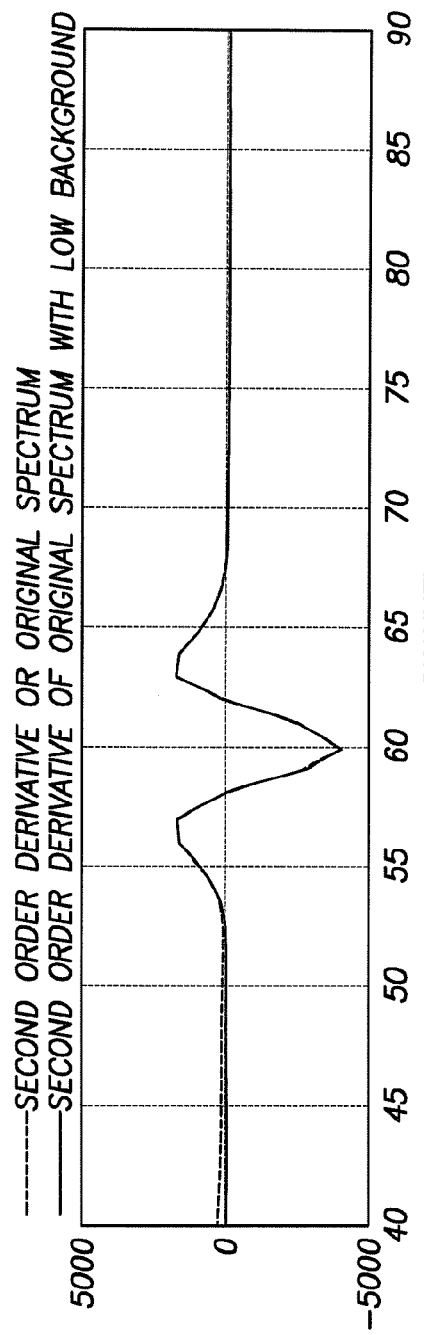

METHOD AND APPARATUS FOR GAIN REGULATION IN A GAMMA DETECTOR

CROSS REFERENCE TO RELATED APPLICATIONS

This patent application is a continuation-in-part of patent application Ser. No. PCT/US11/41929 filed Jun. 26, 2011, which is incorporated by reference herein and claims priority to provisional application No. 61/360,345 filed on Jun. 30, 2010.

BACKGROUND

The disclosure relates generally to gain regulation of a nuclear radiation detector, and more particularly to methods and apparatus to regulate the gain based on the gamma ray background generated in the apparatus by inelastic collisions of fast neutrons with the nuclei of some of the elements constituting the apparatus material.

Detectors often play a role in many nuclear measurements. This can include, among others, neutron measurements in industrial applications, homeland security, neutron physics and also in oil well logging measurements using neutron sources. At present, two kinds of detectors may be used in downhole tools. One type of detector can serve to detect fast neutrons and may employ a plastic scintillation detector. A second, more common type can serve to detect thermal or epithermal neutrons such as a $^3$He detector or, less frequently, a scintillation detector using $^6$Li-glass. $^3$He detectors can be virtually insensitive to gamma-rays. $^6$Li detectors on the other hand may have significant gamma-ray sensitivity and suppression or subtraction of gamma-ray induced background in the presence of gamma-rays from inelastic neutron interactions or neutron capture can be difficult and prone to error.

These types of detectors are used in a multitude of downhole tools. The basic application is in the measurement of neutron porosity through the detection of thermal or epithermal neutrons. Other applications may include the determination of neutron-gamma-density (see U.S. Pat. No. 5,608,215 and U.S. Pat. No. 5,804,820, assigned to the assignee of the present disclosure). In addition, the present scarceness of $^3$He, a gas that is widely used in thermal and epithermal neutron detectors, has made alternatives for neutron detection to be of practical interest.

Turning now to background for the present disclosure, gamma ray detectors are used for many nuclear measurements. The usable information from these detectors falls in one or more of the following categories: the number of detected gamma rays, the energy of the detected gamma rays, and the arrival time of detected gamma rays. Equipment employing gamma ray detectors should deliver same or similar answers independent of environmental conditions (e.g. temperature) and changes in the performance of individual detectors and their components (e.g. PMT gain as a function of applied high voltage and scintillator light output).

One operational parameter that may be adjusted for gamma ray detectors is the Photomultiplier Tube (PMT) high voltage. Adjusting the PMT voltage changes the multiplication (or gain) of the electrons that are created when light from the scintillator hits the photocathode. The high voltage can be adjusted to correct for temperature effects, such as a change in the efficiency of the photocathode and/or a change in the scintillation properties of the detector crystal. The high voltage setting on the PMT does not notably affect the detection of the arrival time of gamma rays. The number and energy of detected gamma rays are both sensitive to the PMT high voltage.

A gamma ray is detected upon interaction with the scintillation crystal in the detector, creating light photons. These photons may liberate electrons from the photocathode, which may in turn be accelerated and multiplied in the photomultiplier. The current from the anode of the PMT may be converted to a voltage, which may be digitized and used as an indication of the energy deposited by the gamma ray in the scintillator.

To suppress noise, there can be defined an electronic threshold, below which the digitized signal is discarded and not counted as a gamma ray. If the high voltage setting on the PMT is incorrect relative to this threshold, more or fewer gamma rays may be counted than should be and a response based on counting the total number of gamma-rays may be altered.

An accurate and precise energy calibration of gamma ray detectors may be used for nuclear measurements performed, for example, during well logging. Traditionally, energy calibration, or gain regulation, may be performed by analyzing the position of a reference gamma ray line in the detector energy spectrum. A $^{137}$Cs radioactive source may be added for the purpose of generating the reference gamma ray line. The $^{137}$Cs radioactive calibration source delivers a narrow gamma ray line at 662 keV. The energy of this gamma ray line, however, as well as the typical activity of a micro-stabilization source (some kBq), may not be adequate for some types of measurements. Additionally, there is an ongoing effort to limit the use of radioisotopic sources in nuclear tools for reasons of personnel safety and national security.

SUMMARY

Methods and systems to determine and regulate a gain of gamma-ray detectors in tools equipped with neutron sources are provided. Gain regulation may be based on the gamma ray background resulting relatively intense characteristic gamma ray lines generated in the tool by the interaction of neutrons with the nuclei of some of the elements constituting the tool material. These lines can be used to calibrate the energy scale of the response of the detector, without any added calibration radio isotopic source.

In an embodiment, a method is disclosed for gain regulation of a detector in a downhole tool comprising an elemental composition. The method includes generating neutrons with the downhole tool and acquiring an energy spectrum of gamma rays induced by the neutrons. The energy spectrum includes a plurality of gamma ray lines characteristic of the elemental composition of the downhole tool. The method further includes selecting a first peak in the energy spectrum that corresponds to at least a first gamma ray line having a characteristic energy. The gain of the gamma-ray detector can be estimated based on a position of the first peak in the measured energy spectrum.

Another embodiment discloses a system. The system includes one or more tool components collectively comprising an elemental composition. The system also includes a neutron source that generates neutrons and a gamma-ray detector that measures an energy spectrum of gamma rays induced by the neutrons. The energy spectrum includes a plurality of gamma ray lines characteristic of the elemental composition. The system also includes a processor that selects a first peak in the energy spectrum that corresponds to at least a first gamma ray line having a characteristic energy, and estimates a gain of the gamma-ray detector based on a position of the first peak along the measured energy spectrum.

In still another embodiment, a method is disclosed. The method includes generating neutrons, and acquiring an energy spectrum of gamma rays induced by the neutrons. The method also includes identifying a first peak in the energy spectrum of gamma rays. The method further includes analyzing the first peak for relationship to a characteristic energy level associated with an elemental composition in or proximate to the gamma-ray detector. The method additionally includes estimating a position of the first peak along the energy spectrum. The method includes calibrating a gain of the gamma-ray detector based on the estimated position of the first peak.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the methods and apparatuses for gain regulation in a gamma regulator are described with reference to the following figures. The same numbers are used throughout the figures to reference like features and components.

FIGS. 4-1 and 4-2 show a tool with a boron-shielded detector according to one embodiment of the disclosure.

FIGS. 6-1 and 6-2 show an alternative two-layer scintillator for enhanced neutron detection in accordance with embodiments of the present disclosure.

FIGS. 7-1 and 7-2 show an alternative segmented crystal with boron layers in accordance with embodiments of the present disclosure.

FIG. 8 shows an alternative scintillator configuration having two PMTs to optimize spectral performance in accordance with embodiments of the present disclosure.

FIGS. 9-1 and 9-2 show a gamma ray spectra acquired in medium porosity Sandstone and Limestone. FIG. 9-1 depicts a total gamma ray spectrum, without detection time discrimination. FIG. 9-2 depicts the energy spectrum of the gamma rays emitted after an inelastic collision of the neutrons with the nuclei of the surrounding matter.

FIGS. 12-1 and 12-2 are graphs of the effect of a contaminating peak on the gain regulation when using a first order or second order derivative in accordance with an embodiment of the present disclosure.

FIG. 13 is a graph of the effect that a change in the amount and shape of gamma ray background can have on the peak that is used for gain regulation in accordance with an embodiment of the present disclosure.

FIGS. 14-1 and 14-2 are graphs of the effect of a changing background on the gain regulation when using a first order or second order derivative in accordance with an embodiment of the present disclosure.

DETAILED DESCRIPTION

Figure 1:
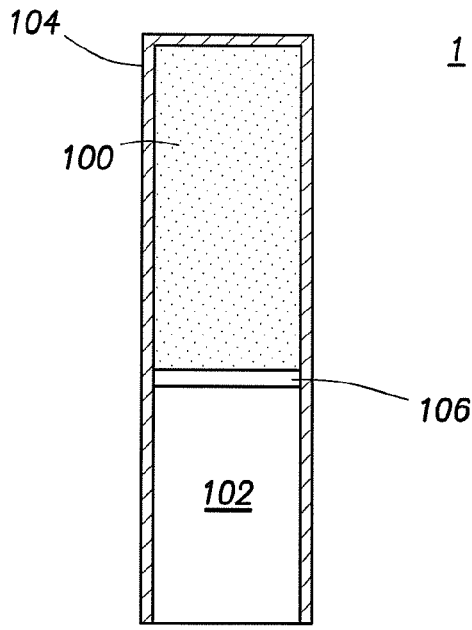
FIG. 1 shows a schematic of neutron detection according to the present disclosure.

In the following description, numerous details are set forth to provide an understanding of the present disclosure. However, it will be understood by those skilled in the art that the present disclosure may be practiced without these details and that numerous variations or modifications from the described embodiments are possible.

Here, we present an apparatus and method for detecting neutrons using a boron-shielded gamma-ray detector, which may be used to detect the 0.48-MeV prompt gamma ray due to the $^{10}$B $(n,\alpha)^7$Li reaction. The gamma ray detector can be a proportional gas counter, a scintillation based detector, or a semiconductor detector. Monoenergetic prompt gammas produce a sharp peak in the pulse height spectrum of a gamma-ray spectroscopy detector. The count rate in the peak is proportional to the neutron interaction rate with the $^{10}$B isotope. Natural boron contains about 20% of $^{10}$B. If one surrounds a gamma detector with a layer containing $^{10}$B, one can measure the gamma signal and neutron signal at the same time and at the same physical location in an instrument. This technique may be applied to many neutron logging tools with gamma detectors. In particular, the approach can be used to measure neutron porosity simultaneous with gamma-ray counting or spectroscopy at the same location as long as the 0.48 MeV gamma-ray from the neutron reaction does not interfere with the gamma-ray measurement.

Additionally, we present apparatus and methods for regulating the gain of gamma-ray detectors in tools equipped with neutron sources. Gain regulation according to various apparatus/methods of the present disclosure can be based on the gamma ray background generated in the tool by inelastic collisions of fast neutrons with the nuclei of some of the elements constituting the tool material. Some chemical elements that are used in the construction of the tool's mechanical parts result in relatively intense characteristic gamma ray lines in a measured energy spectrum. These lines can be used to calibrate the energy scale of the response of the gamma ray detectors, without any added calibration radio isotopic source.

Boron is a very good useful thermal neutron absorber due to the high absorption cross section of $^{10}$B, which has 19.8% abundance in the natural boron. Enriched Boron is readily available to increase the absorption probability further.

The thermal neutron interaction with $^{10}$B is the $(n,\alpha)^7$Li reaction shown in the reaction described by Equation 1 below.

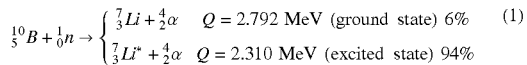

where n is neutron, and a represents an alpha particle.

This interaction will release a total energy of 2.792 MeV with the reaction product $^7$Li in the ground state or 2.310 MeV with the $^7$Li in the excited state. The latter reaction will happen 94% of the time. $^7$Li in the excited state will immediately decay to the ground state and release a gamma ray with energy of 0.48 MeV.

Neutrons are neutral in charge and thus require conversion to detectable particles. One thermal neutron conversion reaction is the $^{10}$B(n, α)$^7$Li reaction. The large amount of energy is shared by $^7$Li and alpha particles, which can ionize matter and generate electronic signals in a detector. A conventional use of the $^{10}$B neutron reaction for neutron detection may be in the $BF_3$ gas-proportional counter and, more recently, in proportional counters (straw detectors) with $^{10}$B lined walls intended to replace $^3$He detectors, for example, in several homeland security applications. The $BF_3$ neutron detector is well documented in text books and widely used in universities, laboratory and industry.

However, the characteristic 0.48 MeV gamma ray, which is present in 94% of the neutron reactions, can be detected by a modern gamma detector. The method disclosed herein detects thermal neutrons based on the 0.48 MeV prompt gamma from the $^{10}$B(n, α) reaction.

FIG. 1 shows a schematic of the neutron detector 1 in accordance with an embodiment of the present disclosure. The scintillator 100 and photomultiplier tube 102 (PMT), coupled by an optical window 106, are surrounded by a thin shielding layer containing boron 104. The thickness of the boron containing shielding layer 104 may be sufficient to absorb almost all thermal neutrons. When the boron containing shielding layer 104 absorbs a neutron, it will emit $^7$Li and alpha particles and a gamma ray 94% of the time. The Li and alpha particles are heavy charged particles so that they can be shielded either by the boron containing shielding layer 104 itself, the thin detector housing, or the optical reflector that surrounds a scintillator 100, while the 0.48 MeV gamma ray will penetrate the boron containing shielding layer 104 and detector housing (as shown in the tool figure of FIG. 4), and often deposit its energy in the detector 1. Thus, the 0.48-MeV peak in the detector's gamma ray spectrum corresponds to neutrons absorbed in the boron containing shielding layer 104.

Figure 2:
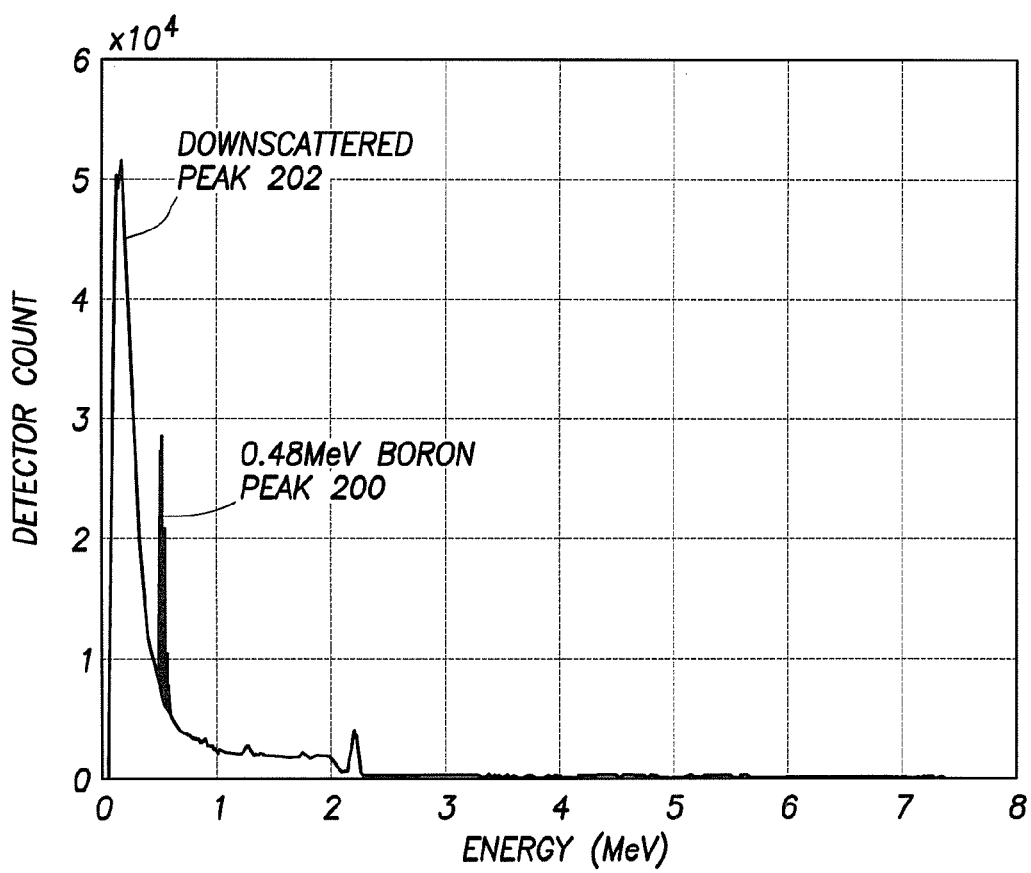
FIG. 2 shows a spectrum measured in a boron-shielded detector, with the boron peak highlighted.

Since this prompt gamma-ray is monoenergetic, it produces a sharp peak in a detector with sufficient resolution. FIG. 2 shows a typical spectrum measured in a boron-shielded detector of FIG. 1, with the boron peak highlighted. The spectrum of FIG. 2 plots detector count (y-axis) as a function of energy (x-axis). One method of determining a signal that is representative of the neutron signal is to determine the counts in the boron full energy peak, and separate the peak from the larger down-scattered peak. The separation may involve some basic fitting techniques, such as a polynomial fit and exponential fit, or another appropriate functional form to the part of the spectrum before and after the boron peak in order to subtract the background.

FIG. 2 shows the boron peak 200, which is separated from the down-scattered section 202 of the spectrum. An alternate method is to sum the counts in the boron energy window, which would give a higher count rate with better statistics, but would also have a contribution from gamma rays that would not be representative of thermal or epithermal neutrons interacting with the boron containing shielding layer 104 surrounding the scintillator 100. In a potential worst scenario, the boron peak 200 may have some contamination from other gamma rays, but the total area will remain dominated by the 0.48-MeV gamma-ray from the neutron interaction.

In neutron induced gamma-ray spectra, there may be a prominent 511-keV gamma-ray line from the annihilations of positrons created by electron-positron pair production. With a detector of sufficient energy resolution, it is possible to separate the two lines located at 0.48 MeV and 0.511 MeV respectively. If the peaks overlap due to limited detector resolution, sophisticated fitting can be used to isolate the contribution from the two separate lines. This can be achieved by fitting two Gaussians and a background to the two peaks. The background may be assumed to be linear under the two peaks, but could have a different form, such as an exponential or a higher order polynomial. Standard spectra could also be used to separate the Boron peak from the 0.511 MeV peak.

Figure 3:
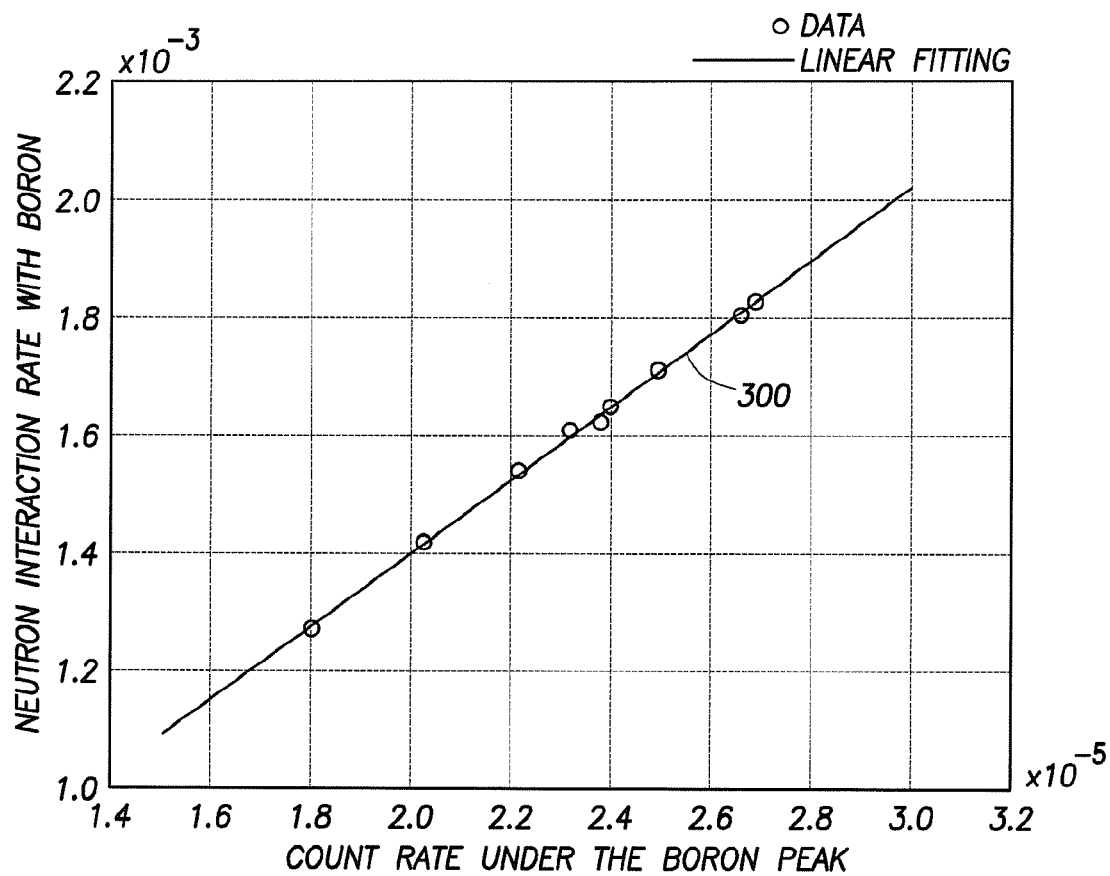
FIG. 3 shows a graph of neutron absorption rate in a boron shield plotted against a count rate under a boron peak in the gamma detector, in accordance with the present disclosure.

Using modeling techniques, we can calculate the neutron absorption rate in the boron containing shielding layer 104 and the gamma detection probability in the detector 1 surrounded by the boron containing shielding layer 104. We can separate the boron peak count rate from the rest of the spectrum using one of the methods mentioned above, and plot the boron peak count rate vs. the neutron absorption rate within the boron shield, as shown in FIG. 3. As shown clearly in FIG. 3, the boron peak 300 is a linear function of the neutron absorption rate. Thus, it may be a good thermal and epithermal neutron measurement.

The detection efficiency may be moderate compared to other neutron detection techniques. First of all, around 50% of the prompt gamma rays from boron may not enter the detector in this simple configuration. Secondly, the gamma rays entering the detector may have a certain probability not to deposit all of their energy, so that they may not score in the full energy peak. To increase the efficiency, a detector with a high peak-to-Compton ratio may be used.

One benefit of this technique is that one can measure both the gamma and the neutron signal at the same time and location. Generally, for a given neutron logging tool with several gamma detectors, one can have both a gamma and a neutron measurement from a single detector using this technique, instead of having a gamma ray measurement per detector. In addition, this technique may require minimal effort to be implemented in a neutron logging tool with a gamma-ray detector. Providing the neutron measurement at the same time and location as the gamma-ray measurement, this technique can make it possible to measure neutron porosity, hydrogen index (HI), the macroscopic thermal neutron capture cross section (Sigma) of the borehole or the formation, gas saturation (based at least in part on inelastic gamma ray count rates), gamma ray spectroscopy (inelastic and capture) and other formation properties using the combination of neutron and gamma measurements.

A scintillation detector can be simultaneously optimized for both inelastic gas detection and inelastic and capture spectroscopy (see P.C.T. Application PCT/US10/35718). If a detector with a low resonance integral, such as $LaCl_3$ is shielded with a layer of boron, the spectroscopy performance may be enhanced by removing the background from most thermal neutron interactions that may occur directly in the detector and that may mask the high energy inelastic and capture gamma rays returning from the formation. These interactions may now occur in the Boron containing shielding layer and the resulting gamma-rays may leave at most about 0.48 MeV in the detector. These neutron induced interactions may still be counted in the total counts during the neutron burst that are used for the inelastic gas measurement. By applying an energy cutoff to the total counts above 0.48 MeV and preserving the higher energy counts for the inelastic gas measurement, a single detector can be optimized simultaneously for both measurements. Alternatively, one can attempt to subtract the contribution based on the capture gamma-ray count rate observed after the burst. In a third approach, the subtraction of the gamma-ray counts during the burst could be based on the total count rate in the peak and could include subtracting the contribution of lower energy signals caused by incomplete absorption of the 0.48-MeV gamma ray in the detector or by 0.48 MeV gamma-rays recorded in the detector after scattering in the material surrounding the detector or the logging tool. This could be done by measuring a standard spectrum corresponding to the 0.48-MeV gamma-rays interacting with the crystal. From the total counts in the peak, the number of lower energy counts corresponding to partial energy deposition in the crystal or to backscattering from the material surrounding the detector can be determined.

The neutron detector described here presents a thermal neutron detector. It could be transformed into an epithermal neutron detector by surrounding the Boron containing shielding layer 104 by a layer of a different neutron absorber, so that epithermal neutrons will reach the boron layer 104. Such a neutron absorber could comprise a material such as Cd or Gd. Another solution would be the use of a layer containing a high concentration of $^6$Li. The $^6$Li as an absorber may involve a reaction $^6$Li(n,α)$^3$H that does not result in the emission of gamma-rays and, therefore, the interaction may not be detected in the scintillation detector, provided that the charged particles created in the reaction do not reach the scintillating material.

Alternatively, the detector could be made directionally sensitive for neutrons by covering a particular part of the scintillator with a layer of boron, while another part may not be covered or may be covered by a different neutron absorber such as Cd, Gd, or $^6$Li.

A downhole tool including such a detector may be conveyed on wireline, slick-line, drill-pipe (TLC) or coiled tubing or may be part of a bottom hole assembly in a drill string, as part of the basic wellsite system as disclosed and referenced above in P.C.T. Application PCT/US10/35718. The downhole tool, discussed further with reference to FIGS. 4-1 and 4-2, may contain the various electronics to acquire data from the detector(s) (e.g., 1 of FIG. 1) and to store them in memory and/or transmit them to the surface (wireline, wired drill pipe, mud pulse and other means of communication to the surface).

Figures 2, 4:
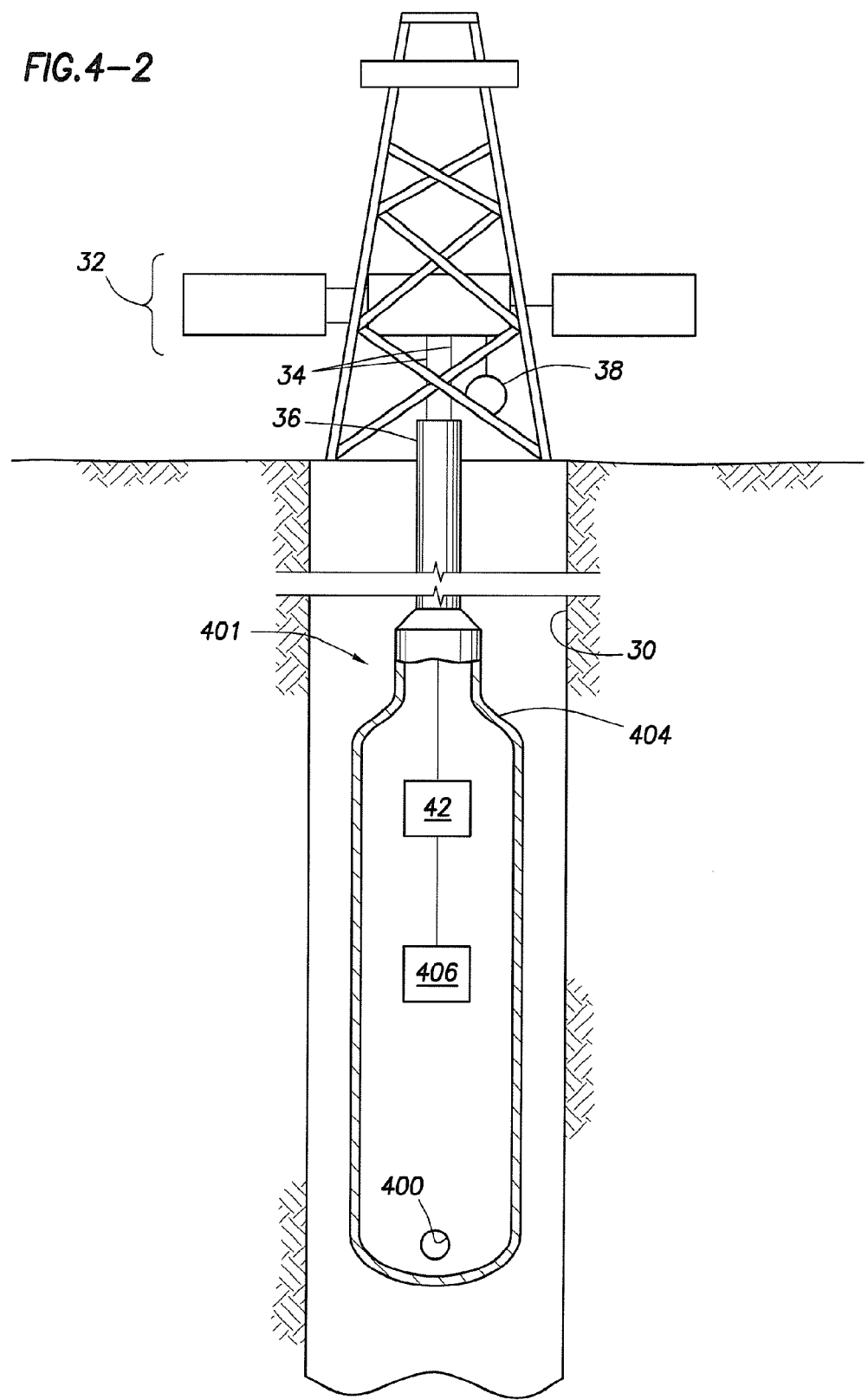

FIG. 4-1 shows a downhole tool 401 in accordance with an embodiment of the disclosure. The downhole tool 401 includes a pulsed neutron source 400 (a radioisotope source like $^{241}$AmBe or $^{252}$Cf could be used for many applications as well) disposed in a pulsed neutron generator 402, within a tool housing 404. The tool also includes a plurality of detectors 406A, B, and C, respectively, each detector including a photomultiplier 408A, B, and C, and scintillation crystal 410A, B, and C, respectively. Neutron-gamma shielding 412 is disposed between the source 400 and the detectors and the three gamma ray scintillation detector scintillators 406A, B, C as described above (see, e.g., FIG. 1 gamma ray detector scintillator 102). While three detectors in FIG. 4-1 are shown as being surrounded by $^{10}$B containing shielding layer 414, optionally some but not all (i.e., one or two) of the detectors may be constructed with this shielding.

FIG. 4-2 shows a system in accordance with an embodiment of the disclosure. A pulsed neutron source 400 is shown mounted in a downhole tool 401 disposed in a borehole 30 that penetrates an earth formation. The downhole tool 401 also includes a detector 406, and a microprocessor 42 linked therein. The downhole tool 401 is shown supported in the borehole 30 by a logging cable 36 in the case of a wireline system or a drill string 36 in the case of a while-drilling system. With a wireline system, the downhole tool 401 is raised and lowered in the borehole 30 by a winch 38, which is controlled by the surface equipment 32. Logging cable or drill string 36 includes conductors 34 that connect the downhole microprocessor 42 with the surface equipment 32 for signal and control communication. Alternatively, these signals may be processed or recorded in the downhole tool 401 and the data transmitted to the surface equipment 32.

It will be apparent to those skilled in the art that embodiments of this disclosure may be implemented by programming one or more suitable general-purpose microprocessors. The programming may be accomplished through the use of one or more program storage devices readable by the processor and encoding one or more programs of instructions executable by the processor for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the processor; in "source code" that may be compiled or interpreted before execution; or in some intermediate form such as partially compiled code. The precise forms of the program storage device and of the encoding of instructions are immaterial here. Thus these processor means may be implemented in the surface equipment 32, in the downhole tool 401, or distributed across the two as known in the art.

Also, for some embodiments a single detector, possibly combined with a neutron monitor could be used. The term "neutron monitor" is intended as a detector placed to measure fast neutrons substantially immediately upon being emitted from the neutron generator 400 to obtain a measurement of the neutron flux from the neutron source. This could allow the construction of a tool with a single detector, which could perform a combined neutron-gamma measurement as described in U.S. Pat. No. 7,365,307, commonly assigned to the assignee of the present disclosure. The number of detectors may not be limited to three, as additional detectors can be used. Also, some of the detectors can be neutron detectors (such as $^3$He detectors).

In some embodiments, the neutron flux detected by the detector of the disclosure may be used to obtain a correction signal to determine the total amount of tool background gamma-rays created in the tool housing and other materials surrounding the detector.

In the detector shown in FIG. 1, a layer containing $^{10}$B surrounds the scintillator and part of the photomultiplier. However, the detection probability for gamma-rays from the shielding covering the PMT may drop as the distance to the scintillator increases. Scintillators used may be known scintillating materials, including but not limited to, Sodium Iodide (NaI), Lanthanum Chloride (LaCl$_3$), Lanthanum Bromide (LaBr$_3$), Yttrium Aluminum Perovskite (YAP), Gadolinium-oxyortho-silicate (GSO), Bismuth Germanate (BGO) to name a few.

Figure 5:
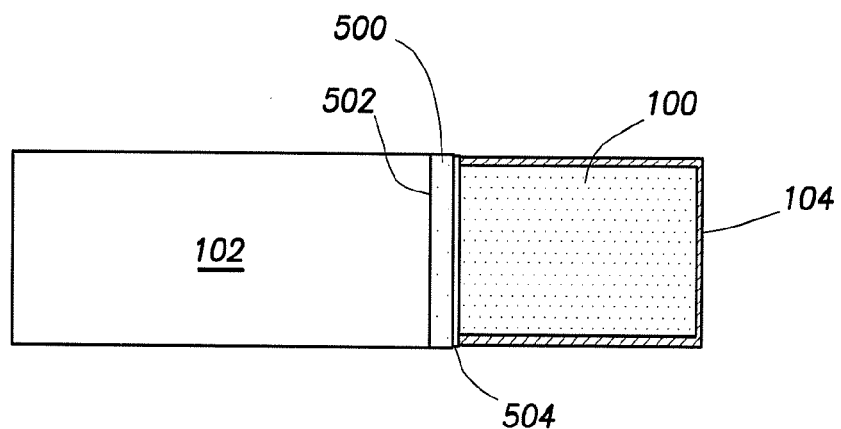
FIG. 5 shows a schematic of a scintillator surrounded by $^{10}$B shielding except on the PMT side, the PMT having an entrance window with high $^{10}$B content according to one embodiment of the disclosure.

Alternatively, the construction shown in FIG. 5 could be used. As shown in FIG. 5, the PMT window 102 may contain $^{10}$B and may act as a converter to emit gamma-rays. If a hygroscopic scintillator 100 that uses hermetic encapsulation is employed, then the exit window (not shown) from the scintillator 100 could be made of a glass window 500 containing a high concentration of $^{10}$B. A transparent optical coupling 504 containing $^{10}$B may be placed between the PMT 102 and the scintillator 100.

While the present disclosure has been described as using a PMT 102 for the photon detection, any other photodetector suitable for the detector application could be used in conjunction with the scintillator 100.

While the present disclosure has been described as using a scintillator to detect the gamma-rays other gamma-ray detectors like semi-conductor detectors (like Germanium detectors, Cadmium Zinc Telluride (CZT), Mercuric Iodide (HgI) to name a few) or gas proportional counters (like Xe-proportional counters) could be surrounded by $^{10}$B in a similar way.

For an inelastic gas measurement as disclosed and referenced above in P.C.T. Application PCT/US10/35718, an alternative method for achieving a low epithermal background during the burst is to use a boron shielded detector with a scintillator material having a low resonance integral and using a cutoff energy in the acquired gamma-ray spectrum, which is higher than the 0.48 MeV boron peak. The prompt gamma rays from boron thermal neutron absorption may be counted at energy levels equal or lower than the 0.48 MeV. In addition, almost no thermal neutrons may be able to penetrate the boron shielding and generate gamma rays within the detector. Thus, the counts with energy levels higher than the 0.48 MeV boron peak may have a much lower percentage of thermal neutron capture gamma rays generated in the scintillator, and a relatively larger percentage of inelastic gamma rays. This may make the inelastic measurement during the neutron burst less sensitive to thermal and epithermal neutrons, which respond primarily to hydrogen content. Therefore, this configuration may be used to differentiate gas porosity from water porosity.

The methods of the present disclosure provide a manner of measuring the thermal and epithermal neutron population during the neutron burst. For the inelastic gas measurement, the inelastic measurement during the neutron burst contains the gamma rays from neutron inelastic scattering, as well as some epithermal neutron and thermal neutron prompt gamma rays. Since one can use this method to measure those epithermal and thermal neutron signals during the burst at the same detector, one can also use this measurement to remove the epithermal and thermal neutron signal from the measurement during the neutron burst and to obtain a cleaner measurement of the gamma rays from neutron inelastic scattering. This clean inelastic measurement is an independent measurement to the thermal neutron measurement after the neutron burst. Thus, the two can be used together to differentiate the gas filled porosity from water filled porosity.

Using proper upper and lower energy thresholds just above and below the boron peak, one can measure the multi-channel spectrum (MCS) time spectrum of the boron peak. This time spectrum corresponds to epithermal and thermal neutron absorption in the boron shielding. Thus, it can be used to measure the formation and/or borehole Sigma. The time spectrum could also be used to calculate an epithermal slowing-down time, which may be used as an indicator for tool standoff.

Since the MCS spectrum mentioned above corresponds to a neutron measurement, the apparent Sigma based on this spectrum may be different from the apparent Sigma measured from the capture gamma ray time spectrum (i.e. the MCS spectrum associated with energies above 0.48 MeV). The difference can be used in terms of depth-of-investigation, borehole size effect, borehole salinity effect, casing size effect, cement effect, lithology effect, HI effect, and gas effect. Thus, the apparent Sigma based on the boron peak in the spectrum can be a stand-alone Sigma measurement, or can be used to correct the gamma-ray-based Sigma for environmental effects.

For a logging tool with two or more detectors with boron shielding, the ratio of the boron peak measurements from any two detectors can be used to measure the formation and borehole HI. One can also use a ratio of the boron peak measurement from one detector and a capture gamma ray measurement from another detector to measure the formation and borehole HI. These HI measurements may be different from the HI measurement based on the capture gamma ray ratio in terms of depth-of-investigation, borehole size effect, borehole salinity effect, casing size effect, cement effect, lithology effect, and gas effect. Thus, these HI measurements can be stand-alone HI measurements, or be used to correct those effects for the HI measurement based on the capture gamma ray ratio.

The boron peak measurement in the detector can be used as an independent count rate to normalize another detector output in order to cancel the absolute neutron output from a pulsed neutron generator, which may not remain constant. It can be used to normalize the output from another detector, and also the measurements from the current detector itself.

This disclosure also provide a method to measure thermal and epithermal neutrons entering the boron shielding. Such a neutron measurement can be used for other applications, which are not mentioned above.

Additional thermal neutron absorbers such as $^6$Li can be added outside the boron shielding to absorb most thermal neutrons and allow some epithermal neutrons to pass through and reach the boron shielding. Thus, the 0.48 MeV prompt gamma rays measured in the detector may correspond to the epithermal neutrons, but not the thermal neutrons. This provides a method to measure the epithermal neutrons. This measurement can be used for the applications mentioned above in addition to others not listed.

The methods herein may provide a neutron measurement at the exact same location and time of the gamma detector.

A lead or other heavy metal shield around a Boron wrapped scintillator could be used to improve the signal-to-noise ratio for neutron detection. This can make it a more pure neutron detector, or if the detector is in a high count rate environment, it can be used to increase detection of neutrons versus gamma rays. Reduction of low energy gamma rays coming from the formation can also facilitate the extraction of the neutron signal from the spectrum.

The gamma ray detector can be partially covered in Boron (e.g. the top or bottom half axially or the front or back half azimuthally) to tune the sensitivity for neutron detection to a different depth of investigation or to alter the sensitivity to the borehole or formation. This technique could, for instance, be used to correct for borehole effects. For azimuthal measurements, it may be optional to cover the opening in the boron layer with a different neutron absorbing material. Otherwise, thermal neutrons entering a scintillation detector with a low neutron capture cross section from the open side may have a high probability of getting absorbed in the shielding on the opposite side. This may greatly reduce the azimuthal sensitivity.

In comparison to presently used Pulsed-Neutron-Capture tools, i.e. tools that measure the macroscopic thermal neutron capture cross section of the formation (Sigma) and/or the borehole (Sigma-Borehole), the apparatus of the present disclosure may make it possible to measure a Sigma, which is virtually free of contributions from neutron capture in the detector and, therefore, represents a true gamma-ray sigma with the associated deeper depth of investigation. Conventional gamma-ray detector based sigma tools may exhibit a mix of signals that comprise neutrons interacting with the tool and with the scintillation crystal (and its shielding) and gamma-rays that are due to neutron capture in the formation and the borehole. Due to the shallower depth of investigation associated with the neutron-neutron based sigma, this may increase the borehole contribution and the required borehole correction. This may be possible with the apparatus of the present disclosure, if one sets the gamma-ray threshold above 0.48 MeV and if the gamma-ray contribution from neutron capture in the tool is small. The latter can be achieved by proper selection of materials and additional shielding.

In the embodiments described so far, at least 50% of the gamma-rays may not interact with the scintillator. This can be changed by using multiple/segmented scintillators as indicated in FIGS. 6-1 and 6-2, 7-1 and 7-2, and 8. FIG. 6-1 shows a scintillator having two portions: an inner cylindrical scintillator 600 (though other shapes are equally plausible) and a cylindrical outer scintillator 602 on the outside with a boron layer 604 separating the two, along with an end layer of boron 606. FIG. 6-2 shows an end view of the configuration of FIG. 6-1 without an end layer. If the scintillator on the outside is dimensioned in such a way as to insure that most of the 0.48-MeV gamma-rays deposit their energy, then a significant increase in the neutron sensitivity can be achieved. However, the complex shape of the scintillator and the fact that it may be read by a single PMT may compromise the spectral quality (spectral resolution of the assembly). Also, the scintillator could have a small neutron capture cross section and resonance integral. The neutron detection probability can be enhanced further by adding a shielding-layer at the end of the scintillator. However, this layer may have a reduced probability that the 0.48 MeV gamma-ray will be detected. Additionally, the PMT window can be made of a boron-glass (i.e. Borosilicate) possibly made with enriched $^{10}$B.

An alternate embodiment is shown in FIGS. 7-1 and 7-2. As shown in FIGS. 7-1 and 7-2, the scintillator is separated into a plurality of segments 700 (four as shown, 700A, 700B, 700C, and 700D respectively), each of which are separated from the adjacent segments by thin layers of boron 702. Each boron layer is in addition to proper reflectorizing of the scintillator surfaces to minimize light losses. As with the embodiment shown in FIGS. 6-1 and 7-2, an end layer of boron 704 may also be optionally included.

In yet another embodiment, the output of the scintillator(s) could be captured by two PMTs 800 and 802 respectively on opposing sides of the segmented scintillator with an inner scintillator segment 600 and an outer scintillator segment 602 separated by a boron layer 604 as shown in FIG. 8. In addition to the reflecting material that can be used to surround a scintillation crystal, the opposing ends of the scintillation crystal can be reflectorized with reflectors 805 to ensure that light passes to the PMT window 804 or 806 respectively and to the PMTs 800 and 802.

Gain Regulation Based on Neutron Induced Instrument Background

Methods and apparatus presented here propose novel techniques of gain stabilization, based on the position of gamma ray lines characteristic of the instrument material, such as, but not limited to, the gamma ray line characteristic of the boron layer of shielding discussed above. These characteristic gamma rays may be generated by interaction of neutrons with the instrument materials, such as but not limited to Boron (B) including an enriched $^{10}$B isotope, Iron (Fe), Chromium (Cr), Manganese (Mn), Nickel (Ni), Titanium (Ti), Cobalt (Co), and others that are frequently found in the materials used for tool components such as shielding, housing, chassis, etc. A first aim of the present methods/apparatus is to overcome the lack of accuracy and precision of various techniques for gain regulation. A second aim is to do so without the use of a radioisotope stabilization source such as $^{137}$CS, $^{22}$Na, $^{134}$Ba and $^{60}$Co to name a few. The present methods/apparatus can optionally be implemented in the down-hole software of an instrument such as a logging tool, for real time regulation of the gamma detector gain. Energy calibration offset and/or non-linearity can also be estimated with the proposed techniques if at least two or three characteristic lines respectively can be identified in the gamma-ray spectrum of interest.

Referring back now to FIGS. 4-1 and 4-2, in a downhole tool 401 employing a neutron source 400 in a generator 402 and one or more gamma ray detectors 406A, B, and C, respectively, equipped with acquisition and processing electronics (which may be located in the tool, in surface equipment, or distributed between the two), the detectors 406A, B, and C can detect the gamma rays resulting from the interaction of the neutrons with the elemental composition of the tool components surrounding the source 400 or detectors 406, and measure the energy of these gamma rays. For downhole tools, such as those used in formation evaluation logging, steel and/or other commonly used metallic alloys may be used for tool structural components, and, in particular in Logging-While-Drilling (LWD) tools, a large fraction of the gamma rays resulting from inelastic scattering of fast neutrons may be generated in the structure of the tool itself. These gamma rays are referred to herein as "inelastic tool background." Thus, the energy spectrum of the gamma rays may contain information that is characteristic of the elemental composition of the tool. Likewise, capture tool background can contain gamma rays characteristic of the elemental composition of the tool.

By determining the position in the energy spectrum of one or more of the characteristic gamma-ray lines of elements of the tool material along the measured energy spectrum, it may be possible to obtain the energy calibration of the gamma ray detectors without a dedicated radioactive calibration source or a dedicated neutron calibration target (i.e. without adding a dedicated material to the tool for the sole purpose of generating calibration gamma-rays.) In particular embodiments, gamma rays resulting from interactions with, Iron (Fe), Chromium (Cr), Manganese (Mn), Nickel (Ni), Titanium (Ti), Cobalt (Co), Aluminum (Al), and others, often present in components of the tool, are of practical use for gain regulation. Additional embodiments could use gamma-rays due to neutron capture (such as the neutron capture reaction of $^{10}$B, Mn and many others) or due to the activation of materials (such as Fe, Mn, Cu etc) in the tool for gain regulation. Once the gain is estimated, the gain can be adjusted accordingly, by analog or digital techniques, including adjusting high voltage to the PMT, and other conventional techniques for adjusting the gain.

When peaks corresponding to one or more characteristic gamma ray lines of known characteristic energies can be identified in the measured spectrum, and their positions in the spectrum determined, then these peaks relating to characteristic gamma ray lines can be used as calibration points in lieu of gamma ray lines generated by a separate dedicated radioisotope source, as used by other techniques. The principle of this method may be applicable to spectral detectors based on any technology.

When the position of more than one peak can be determined, then the energy calibration of the detectors can additionally include an offset term (using a first order calibration with at least two peaks available) and a non-linearity parameter used for evaluating the linearity of the energy conversion (second or higher order calibration with at least three peaks available), in addition to the gain parameter. In situations where two peaks are used to derive a gain and offset, the value of the gain found in this manner may differ from the value of the gain calculated from the position of one peak, except if the actual offset is zero. The determination of gain and offset (and linearity) may not be independent of one another.

In a specific embodiment of tool with a boron shielded detector described above, the 0.48 MeV boron peak from the $^{10}$B neutron capture reaction may be present in the detector when neutrons are also present. Therefore, one can use the 0.48 MeV boron peak to regulate the detector gain to make sure the boron peak would appear in the same energy channel. In this way, there may be no need for a radio-isotope source, such as $^{137}$Cs used in U.S. Pat. No. 7,446,308, inside the tool dedicated to gain regulation. This can be a step towards a fully sourceless tool (i.e. a tool not containing any radioisotope sources) and it can also make it easier to gain regulate a tool that is not communicating with uphole equipment and does not have a large amount of processing power.

The methods/apparatus proposed can be used as an initial step in a multi-stage gain regulation computation, before the final calculation is done through a least squares fit, or used directly to derive the detector operating gain without further calculation. For example, the following known methods may be in use, and could be used in any order, and in combination with the methods proposed herein.

WINDOWS METHOD: An easily identifiable peak may be selected in a gamma ray spectrum. The peak can either be a gamma-ray line in the neutron induced spectrum (e.g. hydrogen) or a peak created by gamma-rays from a stabilization source (e.g. $^{137}$Cs) positioned near the gamma ray detector. For the windows method, the background below the peak may be small relative to the height of the peak (i.e., less than half the height of the peak) and/or linear. No other peaks should be nearby (i.e., within about 3 standard deviations in most circumstances) that can distort the spectrum enough to bias the result of the algorithm. Two windows can be used around the peak in the gamma ray spectrum to create a form factor that regulates the gain in such a way that the difference of the windows is about zero when the gain is correct, and when the difference of the windows is not zero, the sign of the difference can be used to indicate the direction of the gain adjustment, i.e., whether to increase or decrease voltage, for example. If the effect of the background on the windows method is non-negligible, e.g., when the background is not a uniform function of energy, additional windows can be used outside the ones around the peak (such as in a 4-window algorithm). These windows can be used in a linear background correction. An example of the windows method is shown in U.S. Pat. No. 3,939,343.

MOMENTS METHOD: The first moment of the spectrum or a certain part of the spectrum may be its center of gravity, which can be a useful number when employed in gain regulation. The moment of the whole spectrum, or part of it, can be used to determine the gain of a gamma ray detector. The first moment M of a group of channels i between a lower limit LL and an upper limit UL can be calculated using Equation 2 as follows:

$$M = \frac{\sum_{i=LL}^{UL} C_i \cdot i}{\sum_{i=LL}^{UL} C_i} \quad (2)$$

in which $C_i$ is the number of counts in each channel and i the channel number. The moments method can be improved by calculating the moment of parts of the spectrum in energy and time that may be relatively invariant (e.g. the part of the spectrum above 6 MeV during the neutron burst from a neutron generator). An example of this method is described in U.S. Pat. No. 5,420,422.

NON-LINEAR LEAST SQUARES FIT: The non-linear least squares fit method can be used for detectors that detect neutron-induced gamma ray spectra and also in spectral natural gamma-ray tools. A set of standard elemental component spectra may be created that can be combined mathematically to recreate a spectrum that is recorded in an unknown condition. The contributions of each of the component spectra may then be determined using a least squares minimization. The gain can also be included in the Jacobian for this minimization and this method may be used in situations where ample computer power is available and a very accurate gain regulation is desired, such as, for example, a determination of gain to within 0.25% of the desired value (see e.g. U.S. Pat. No. 5,360,975). There are multiple methods for performing a non-linear least squares fit. One approach uses the Marquardt method (also known as the Marquardt-Levenberg method).

FIRST DERIVATIVE: The first derivative of a spectrum can be used to locate the peaks and can be used to adjust the gain. Similar to the windows method (under some equivalent conditions), using the first derivative can be sensitive to the shape and magnitude of the background below the peak of interest. Corrections can be made to reduce the sensitivity to the background. When no background is present or in the presence of a background that is independent of energy, the peak position can be found at the zero-crossing of the first derivative. Alternatively, if the peak is symmetrical or substantially symmetrical, the peak position can be found as the average of the positions of the maximum and minimum of the derivative below and above the peak of interest. One example of the first derivative method in application is described in U.S. Pat. No. 7,253,401.

PEAK FITTING METHOD: If the shape of the peak and of its background is known, a peak fitting method can be used to determine the peak position. For a robust answer, this method may use good counting statistics. This method can also be used in the presence of overlapping peaks (e.g., in one example, "overlapping" might include those spaced closely enough to one another that the centroids are within three standard deviations), by fitting to both peaks and their background simultaneously. The fit can be constrained, if the relative position of the peaks is known. Various peak fitting methods are discussed in U.S. Pat. No. 7,081,616.

As stated above, any of the listed methods, the windows method, the moments method, the non-linear least squares fit method, the first derivative method, or the peak fitting method, and any combination thereof, may be combined with the novel methods presented here. Combinations of the methods can be used to calculate a gain that is unlikely to be achieved with any technique alone. The methods presented here can also be used in a more comprehensive gain regulation scheme in which more robust but less accurate methods are used first to get the gain in range, and then more accurate but less robust methods can then be applied afterwards to finely regulate the gain until the gain is within a desired range.

As illustrated in the example shown in FIGS. 9-1 and 9-2, some peaks characteristic of the elemental composition of the tool material may be visible in the energy spectrum of the gamma rays detected in the detector 406 (FIG. 4). FIGS. 9-1 and 9-2 are graphs of a total spectrum 900, 901, respectively, as a function of counts per channel (y-axis) versus energy (x-axis). For the example of FIGS. 9-1 and 9-2, measurements were taken using a pulsed neutron generator as the neutron source, and a $LaBr_3$:Ce crystal based gamma ray detector, embedded in a LWD tool. In particular, the following characteristic lines corresponding to inelastic neutron scattering gamma rays are clearly visible in the 300-3000 keV energy range (see Table 1 below). A range of energies is indicated since there is more than one (unresolved) gamma ray line in a measured gamma-ray peak.

TABLE 1

Energies of gamma-rays induced by inelastic scattering of fast neutrons of common materials of construction of downhole tools

| Energy (keV) | Element |
| --- | --- |
| 847-858 | Fe, Mn |
| 1166-1238 | Mn, Fe |
| 1434-1454 | Cr, Ni |

The chemical make-up of the metals thus comprises the elemental composition of tool structure (chassis, mud channel and collar in the case of an LWD tool, and in the case of a wireline tool, the materials would principally be those of the chassis and/or the housing). Some of these materials, in particular, Fe can be present in the formation or borehole as well.

FIG. 9-1 on the left shows an example of a measured total energy spectrum of the gamma rays detected by a $LaBr_3$ scintillation detector in an LWD tool equipped with a pulsed neutron source (plotted on 9-1 as energy in keV versus counts per channel). The spectrum includes gamma-rays due to various interactions of neutrons with nuclei in the formation, the tool and the borehole. Inelastic neutron scattering (n, n'γ), high energy neutron reactions like (n, p), neutron capture (n, γ), and gamma-rays are emitted by radioactive isotopes created by neutron interactions (neutron activation). These gamma rays may suffer Compton scattering before being detected, and this may lead to a continuous gamma-ray spectrum shown. The 511-keV peak corresponding to the annihilation of a positron, following an electron-positron pair creation or a $\beta^+$-decay, is also visible, but it is not completely separated from the 0.48-MeV peak related to the $^{10}B$ neutron capture in the neutron shielding material placed around the detector and/or the tool. As shown, the energy spectra acquired in both sandstone and limestone formations may be similar up to 1500 keV. Above this energy, the spectral features characteristic of neutron capture by calcium and hydrogen may be visible at about 1954 keV (unresolved triplet) and 2222 keV, respectively. A total gamma ray energy spectrum, such as that shown in the plot of FIG. 9-1 can be obtained with a traditional radioisotope neutron source (AmBe, AmLi, PuBe, or $^{252}Cf$ for instance), as no time discrimination is used to compute the spectrum.

For embodiments of the tool employing a pulsed neutron generator, a d-T accelerator may be used, and the detected gamma rays can be discriminated in time with respect to the neutron emission or neutron burst from the generator. The gamma rays that have been created as a consequence of an inelastic scattering of a neutron can be discriminated from those resulted from neutron capture or from activation. In a general manner, these gamma rays may be emitted following a chronological order, with those induced by inelastic scattering preceding those induced by capture, and those induced by activation arriving last. With such time discrimination capabilities, it may be possible to derive an energy spectrum of the gamma rays related to inelastic neutron scattering by selecting the time window spanning the emission of the gamma-rays of interest.

The spectrum obtained during the neutron burst may not only contain inelastic gamma-rays, but gamma-rays from capture and to a lesser extent from activation may be present as well. In order to obtain a net inelastic spectrum, the contribution from capture and from activation should be removed. A net inelastic spectrum is shown in the plot of FIG. 9-2, plotting as above, energy in keV versus counts per channel. In comparison to the total gamma ray spectrum obtained during the neutron burst shown in FIG. 9-1, the peaks characteristic of Fe, Mn, Cr and Ni have a notably larger amplitude (identifiable visibly on the plot) relative to the continuous spectrum, hence the center of the peaks may be determined with a better precision. The two spectra acquired in both formations (i.e. sandstone and limestone) are substantially similar up to 1650 keV, above which energy the 1778-keV Si peak can be observed. The fact that the inelastic spectrum and, in particular, the net inelastic spectrum, may be largely independent of the surrounding material in this energy region contributes to the ability to use peaks along the spectrum for gain regulation.

Figure 10:
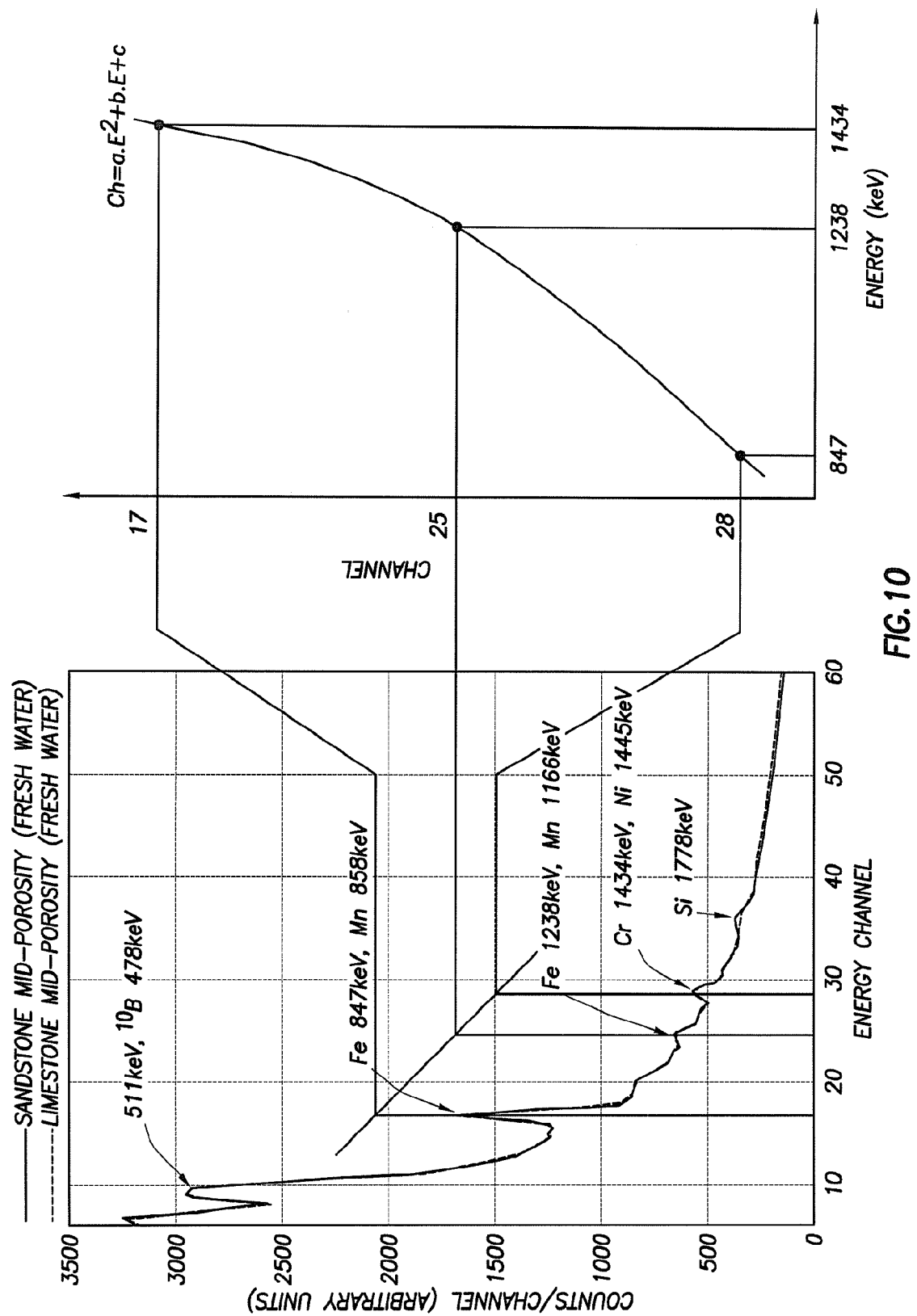
FIG. 10 shows a second order energy calibration derived from the estimation of the position of the center of the peaks chosen in the inelastic spectra in accordance with one embodiment of the present disclosure.

Various techniques can be used to determine the position of the center of the peaks resulting from gamma-rays due to various interactions of neutrons with nuclei in the formation, the tool and the borehole. Conventional peak finding algorithms may be used for this purpose. Once the position of the center of the peaks is determined, the energy calibration (i.e. the amount of adjustment for regulating gain) can be derived since the energy of the corresponding characteristic lines is known (see FIG. 10). FIG. 10 shows the second order energy calibration derived from the estimation of the position of the center of the peaks chosen in the inelastic spectra, plotting the energy channel versus count per channel measured. The gain is noted as "b", the offset is "c" and "a" is the second order non-linear term coefficient. As shown in FIG. 10, characteristic gamma ray lines are shown in the spectrum 480 keV for $^{10}B$, 511 keV for positron annihilation, at 847 keV for Fe, 858 keV for Mn, 1434 keV for Cr, 1445 keV for Ni, and 1778 keV for Si, respectively.

Gain Regulation Based on Second Order (or Higher Order) Derivative

Still another embodiment is envisioned here. We also propose a scheme that regulates gain on the position where the second order (or higher) derivative of a peak with a characteristic energy has a zero or substantially zero (e.g., about 0.05 or less, about 0.03 or less, or about 0.01 or less) crossing within the measurement precision and the correction algorithm. Peaks in gamma ray spectra as observed using gamma ray detectors often satisfy the Gaussian distribution due to the statistical nature of the creation of the spectrum. For a Gaussian distribution, the positions where the derivative (of any order) is equal to zero or substantially equal to zero (i.e., the "zero-crossings") have a proven mathematical relation to the position of the centroid of the peak. This means that the position where derivative of the function of the peak has a zero or substantially zero crossing can be used to regulate the position of this peak and to regulate the gain.

In one specific embodiment, the second order derivative of a certain channel in the energy spectrum can be calculated as a form factor, and the gain can be regulated so that within the statistical uncertainty the time averaged form factor is equal to zero or substantially equal to zero at that certain channel. It is a known mathematical relationship that the second order derivative of a Gaussian distribution with a mean of $\mu$ and a standard deviation of $\sigma$ is equal to zero at the position of (plus or minus) one standard deviation away from the peak centroid (which may be defined as $\mu \pm \sigma$), i.e. at the point of inflection of the Gaussian distribution. Thus, either one or both sides of the peak can be used to regulate the spectral gain when using the second order derivative. Because the second order derivative of a Gaussian distribution may change sign upon crossing the zero point, the sign of the form factor can be used to determine the direction of the gain adjustment that is appropriate. Higher order derivatives may also be employed for gain regulation, using the zero crossings of any higher order derivative to determine position of the peak under analysis.

One benefit of the methods presented here for gain regulation is that they use less computing power due to their computational simplicity, as compared to conventional gain regulation methods. Thus, the methods presented here are particularly suitable for environments where limited computer power is available (e.g. downhole applications).

Figure 11:
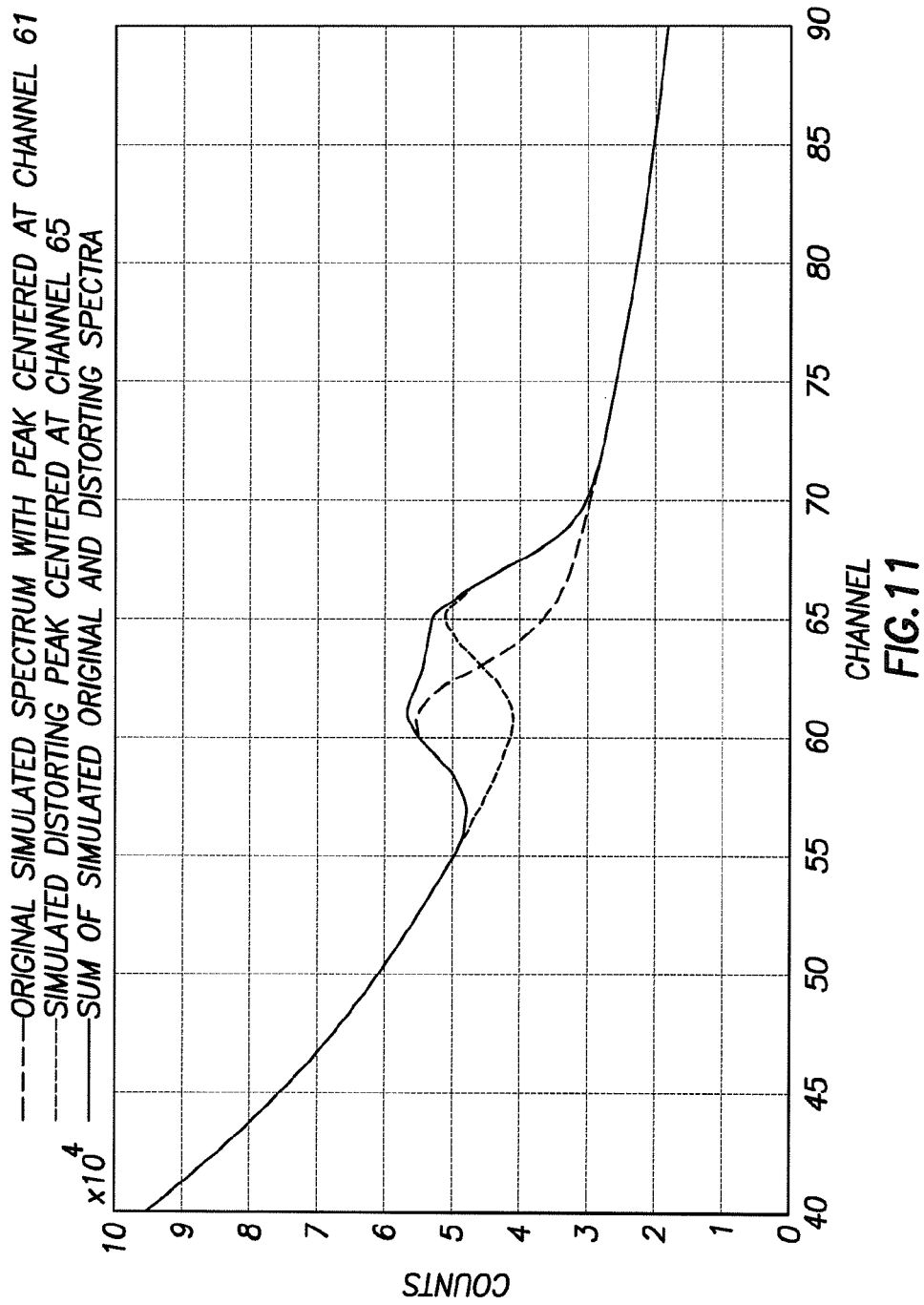
FIG. 11 is a graph of the effect that a contaminating peak can have on the peak that is used for gain regulation in accordance with an embodiment of the present disclosure.
Figures 1, 12:
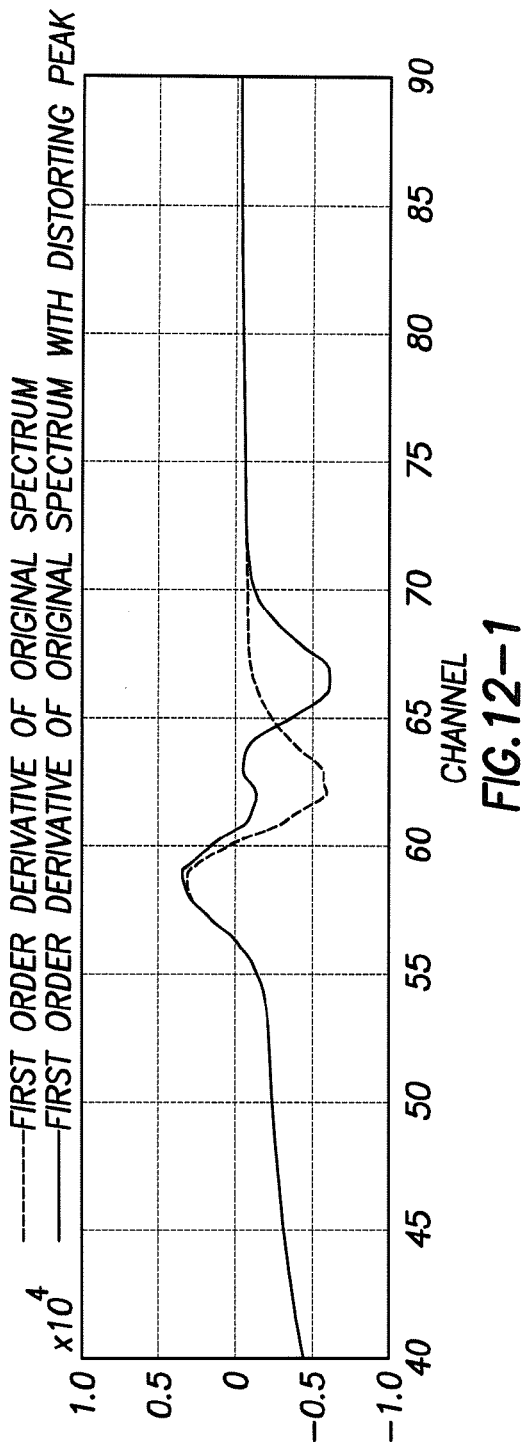
Figures 2, 12:
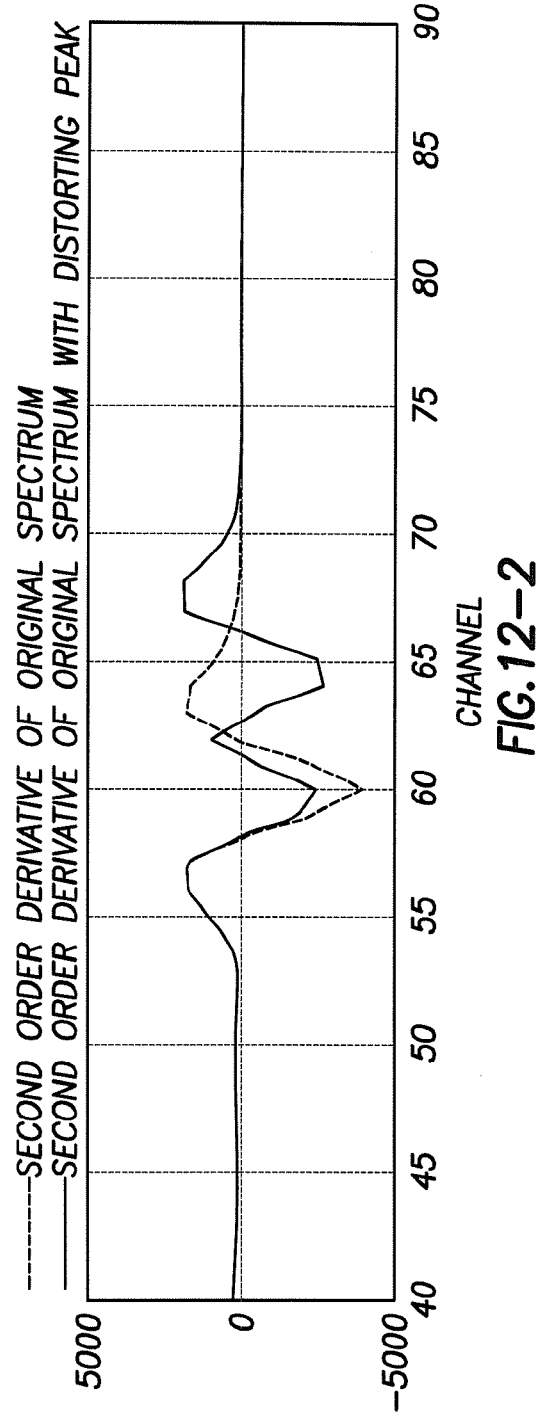

The second order derivative (or alternatively higher order derivatives) method may be less sensitive to some undesired peaks which may overlap the particular peak selected for use as gain regulation calibration reference. By using the second order derivative to regulate based on one side of the peak (which is know to be mathematically one standard deviation from the centroid), the impact of any undesired peaks overlapping the desired peak can be reduced on the other side. By "overlapping," compound peaks of gamma ray lines spaced closely may include those such that the distance between any two peak positions is smaller than a predetermined number of standard deviations, such as in one embodiment, three standard deviations. This is illustrated in FIG. 11 and FIGS. 12-1 and 12-2. FIG. 11 is a plot of counts (y-axis) vs. channel (x-axis). In FIG. 11 it is seen that a nearby (i.e. within 2 or 3 standard deviations of the peak sought to be used as the gain regulation reference peak) contaminating peak can have a visible effect on the shape of the selected reference peak, widening and bluffing the peak as shown, which in turn reflects any determination of the center of the peak, in turn affecting gain regulation that employs the determination of the center of the peak. FIGS. 12-1 and 12-2 are spectra depicting counts (y-axis) vs. channel (x-axis) for first and second order derivatives of an original spectrum and one with distorting peaks. FIGS. 12-1 and 12-2 shows that the second order derivative of the peak shown in FIG. 11 may be less sensitive (reflected in the shape and amplitude) near the zero-crossing, as the shape of the first order derivative shows more sensitivity (the bluffing and widening shown by the sum curve) to the presence of the second peak in the position of its zero-crossing. The additional zero crossings that appear in the first order derivative because of the proximity of an additional peak in the spectrum can make gain regulation difficult in real nuclear spectra with limited statistics.

The higher order derivative method may also be less sensitive to background (as reflected in the peak shape and amplitude) than previously known methods. For example, the second order derivative may be insensitive to a linear background; the third order derivative may be insensitive to a second (or lower) order polynomial background. This advantage is illustrated in FIGS. 13 and 14-1 and 14-2, where 14-1 shows the first derivative with a smaller difference in curves than that seen in the energy spectrum of FIG. 13, and FIG. 14-2 shows the second derivative with an even smaller difference in curves than the curve of the first derivative shown in FIG. 14-1.

The higher order derivative method may be limited by variability in detector energy resolution, which is proportional to the standard deviation and affects the gain regulation. For example, a given detector may have different energy resolution at different temperatures; different detectors may have different resolution although the crystal material and PMT type are the same. The differing standard deviation may cause the zero position of the derivatives to be different relative to the peak centroid. This effect can be corrected in many ways. One or more traditional gain regulation methods (described above, such as windows, moment, nonlinear least squares fit, first derivative, or peak fitting) can be used to produce a correction term for this effect. Alternatively, both of the two zero points, which are two standard deviations away from each other, of the second order derivative may be used to arrive at a correction. Some higher order (>2) derivatives can also be to compute a correction term for this effect. Calibration of each detector to determine its individual resolution may be another solution. The resolution variation due to temperature can be predicted empirically as well.

Returning to the example using the specific boron shielded detector described in detail herein, according to an embodiment of the present disclosure, the gain can be regulated on the shielded spectroscopy detectors using the second order derivative method based on the lower side of the Boron peak that may be seen in the energy spectrum at about 0.48 MeV. This peak can be created by neutrons that are captured by the Boron loaded shielding that is used to prevent thermal neutrons from entering the scintillator and reacting with the scintillator material. The Boron peak is within 3 standard deviations away from the 0.511 MeV peak from positron annihilation, meaning that each peak can cause distortion in the measured spectrum. For this reason, prior gain regulation methods obtain varying results in this energy region, in particular because the relative contributions of the 0.48 MeV and the 0.511 MeV peaks may vary with some environmental conditions. Given a high enough sampling density (for example, but not limited to a sampling density of better than 30 keV per energy channel) and a detector with a good spectral resolution (for example, but not limited to <9% at 662 keV), the method described herein that uses the second order derivative of the energy spectrum can be less sensitive than prior methods to changes in the relative contribution of the two peaks.

For embodiments employing a detector without Boron shielding, the 0.511 MeV peak, or derivatives thereof, can be used for gain regulation. In embodiments where the background is large enough to cause uncertainty in the identity and position of individual peaks and where the background is varying with the environmental conditions, which may be the case in the low energy region of neutron-induced gamma ray spectra, it is advantageous to use the second order derivative (or higher order derivative) method to reduce the background effect, since the second order derivative is insensitive to the existence of a linear background as described previously.

Figure 15:
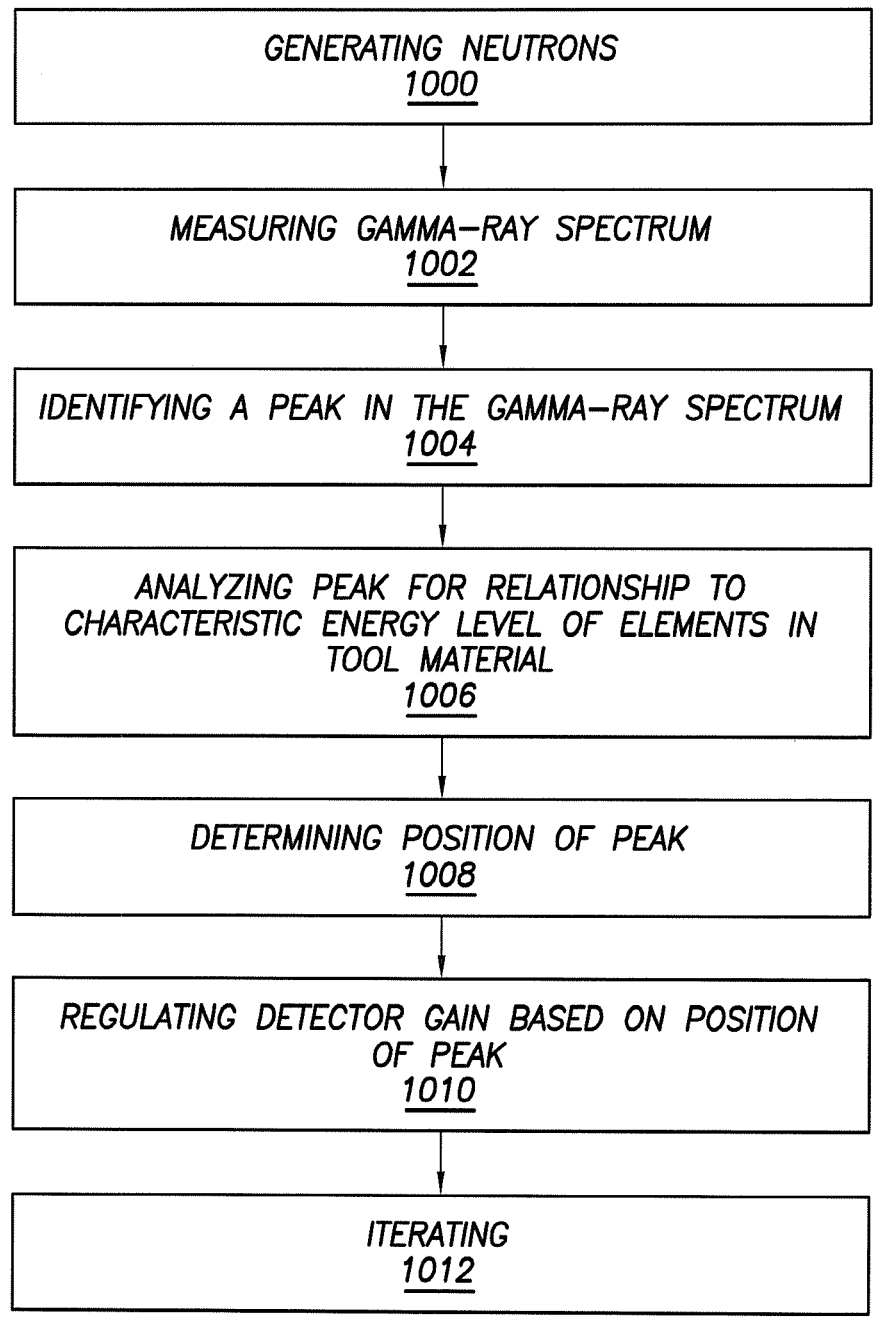
FIG. 15 is a flow chart for a method for gain regulation in a gamma detector in accordance with one embodiment of the present disclosure.

FIG. 15 is a flow chart for a method for gain regulation in a gamma detector in accordance with one embodiment of the present disclosure. The method can be used for gain regulation of a gamma-ray detector in a downhole tool (such as detector 406 of FIG. 4-1 in downhole tool 401 of FIGS. 4-1 and 4-2) comprising an elemental composition. That is, the downhole tool may include a variety of parts, such as a housing, a chassis, shielding material, mud channel, collar, and the like, and collectively, the elements of the materials used in these components result in the elemental composition of the downhole tool overall. The method begins with generating neutrons (1000) with the downhole tool (401). At least one detector 406 of the downhole tool 401 acquires an energy spectrum of gamma rays induced by the neutrons (1002). The energy spectrum may include a plurality of gamma ray lines characteristic of the elemental composition of the downhole tool. The method also includes identifying a peak (1004) (such as, for example, a peak appearing around 0.48 MeV, characteristic of interactions with boron, when boron shielding is present in the downhole tool) in the energy spectrum that corresponds to a first gamma ray line having a characteristic energy. The method includes analyzing the peak (1006) for a relationship to a characteristic energy level of elements in the tool material, i.e., the elemental composition. The analyzing may be performed, for example, by a pulse height analyzer, as is known, and may occur in either a processor located in the downhole tool or in surface equipment.

The method also includes determining the position (1008) of the peak along the energy spectrum. In an embodiment, this determination of position may be performed by various peak fitting algorithms. In another embodiment, the determination of position may be based on a proven mathematical relationship between a zero-crossing of a derivative (first order derivative, second order derivative, or higher order derivative) of a function representing the peak and the center of the peak. The determination of position may also occur in a downhole processor or in a processor in surface equipment. The method includes regulating a gain (1010) of the gamma-ray detector based on a position of the first peak in the measured energy spectrum. In an embodiment, regulating the gain may include adjusting voltage to the PMT of the detector. The method includes iterating (1012) through the method steps 1000-1010. In an embodiment, the period of iteration may be related to the count rate of the detector.

Figure 16:
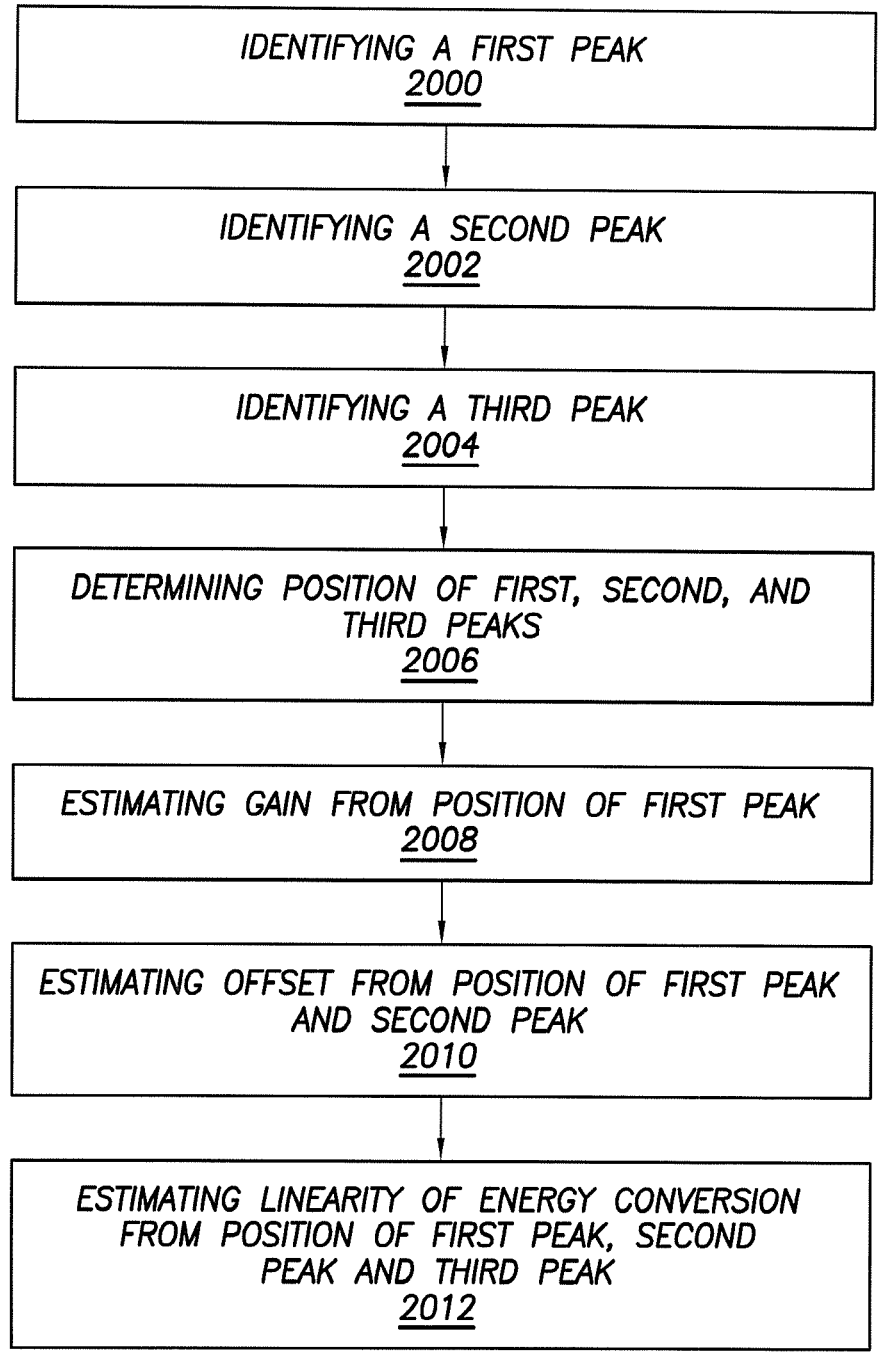
FIG. 16 is a flow chart for a method for gain regulation in a gamma detector in accordance with another embodiment of the present disclosure.

FIG. 16 is a flow chart for a method for gain regulation in a gamma detector in accordance with another embodiment of the present disclosure. In such an embodiment, more than one peak is readily identifiable in a measured energy spectrum. Thus, the method includes identifying a first peak (2000), identifying a second peak (2002), and optionally identifying a third peak (2004). For example, in an embodiment the following characteristic lines corresponding to inelastic neutron scattering gamma rays are clearly visible in the 300-3000 keV energy range: approximately 847-858 keV for Fe, Mn, 1166-1238 for Mn, Fe, and 1434-1454 for Cr, Ni. A range of energies is indicated since there is more than one (unresolved) line in a measured gamma-ray peak. By "readily identifiable" here, we mean that the peak has a larger amplitude than the continuous spectrum around the peak, often by a standard deviation or more, and in various embodiments, in a manner independent of the surrounding formation material.

The method proceeds with determining the position of the first peak, if identified, the position of the second peak in combination with the first peak, and if identified, the position of the third peak in combination with the first peak and the second peak (2006). From the positions, various corrections or calibrations can be determined. The method includes estimating gain from the position of the first peak (2008), estimating offset from the position of the second peak and the first peak (2010), and when a third peak is identifiable, estimating the linearity of the energy conversion from the position of the third peak, the second peak, and the first peak (2012). This is described in further detail herein above.

Figure 17:
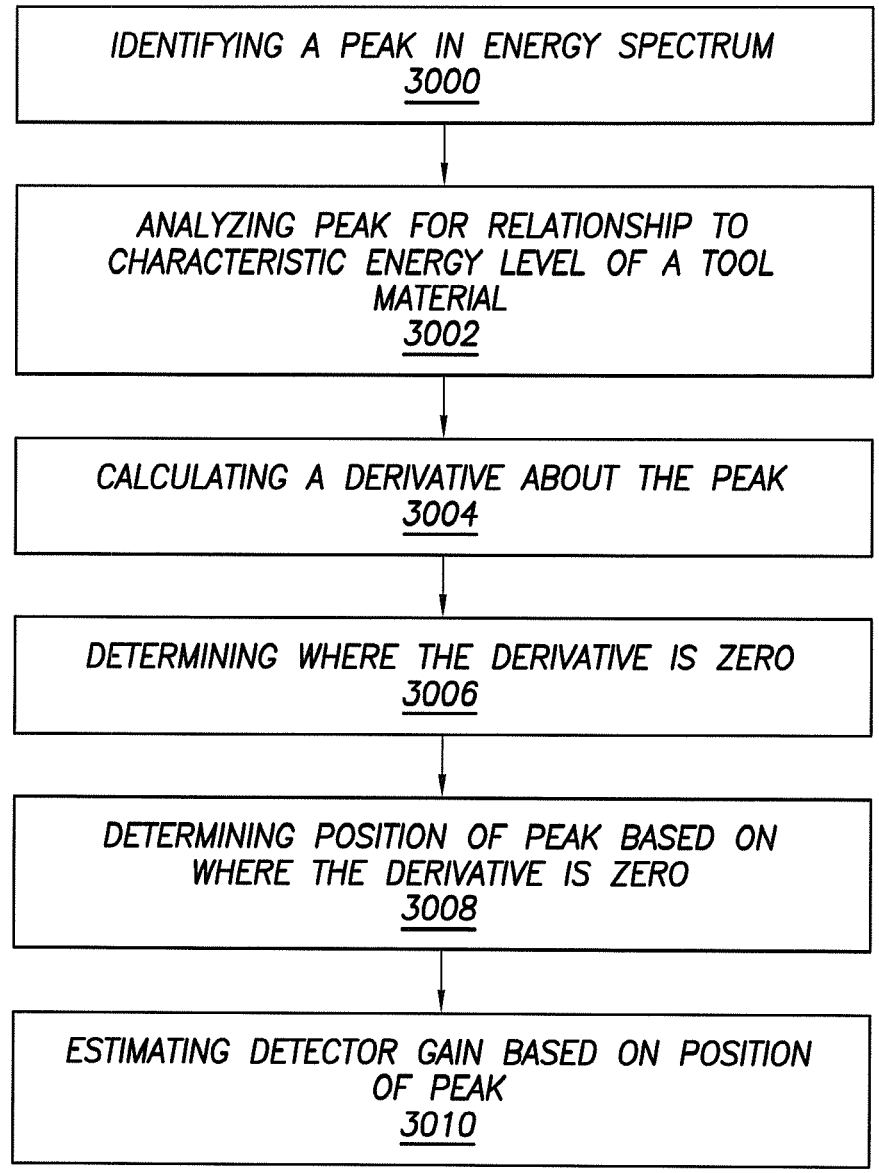
FIG. 17 is a flow chart for a method for gain regulation in a gamma detector in accordance with still another embodiment of the present disclosure.

FIG. 17 is a flow chart for a method for gain regulation in a gamma detector in accordance with still another embodiment of the present disclosure. The method includes identifying a peak in a measured energy spectrum of gamma-rays (3000). The method includes analyzing the peak for a relationship to a characteristic energy level of a tool material (3002). In an embodiment, the analyzing may be performed, for example, by a pulse height analyzer, as is known, and may occur in either a processor located in the downhole tool or in surface equipment.

The method also includes calculating a derivative (3004), such as a first order derivation, a second order derivative, or even a higher order derivative, of the function representing the peak. The method proceeds with determining, as close as possible, where the derivative is zero or almost zero (3006). Based on where the derivative is zero or almost zero (i.e., the position of the zero-crossing), the method includes determining the position of the peak (3008). The method includes estimating detector gain based on the position of the peak (3010). Optionally, in an embodiment where the derivative calculated in 3004 is a second order derivation, the sign of the form factor (as described above) can be used to determine the direction of the gain adjustment that is appropriate, because the second order derivative of a Gaussian distribution changes sign when it crosses the zero point.

While the disclosure has been described in the context of applications in downhole tools, the apparatus of the disclosure can be used in many applications requiring neutron detection such as industrial applications in nuclear reactors or other nuclear installations, in detection technologies for homeland security and in many nuclear physics measurements.

While the disclosure has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the disclosure.

Although only a few example embodiments have been described in detail above, those skilled in the art will readily appreciate that many modifications are possible in the example embodiments without materially departing from this invention. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for gain regulation of a gamma ray detector in a downhole tool, a structure of the downhole tool comprises at least one element, the method comprising:
   generating neutrons with the downhole tool;
   acquiring an energy spectrum of gamma rays induced by the neutrons, the energy spectrum comprising a plurality of gamma ray lines characteristic of the at least one element of the structure of the downhole tool;
   selecting a first peak in the energy spectrum corresponding to at least a first gamma ray line having a characteristic energy;

calculating a derivative around the first peak;
determining a position of the first peak based on where the derivative has a predefined value;
estimating a gain of the gamma-ray detector based on the position of the first peak in the acquired energy spectrum.

2. The method according to claim 1, wherein the energy spectrum spans a time window during which the gamma-rays induced are attributable to at least one of 1) inelastic gamma-rays, 2) capture gamma-rays and 3) activation gamma-rays.

3. The method according to claim 1, wherein the energy spectrum comprises a net inelastic spectrum due to subtraction of at least a portion of the energy spectrum attributable to at least one of capture gamma-rays and activation background.

4. The method according to claim 1, wherein the element of the downhole tool structure comprises material selected from a group consisting of enriched Boron-10 atoms, Iron atoms, Chromium atoms, Manganese atoms, Nickel atoms, Titanium atoms, Cobalt atoms, Aluminum atoms, and any combination thereof.

5. The method according to claim 1, wherein the first peak comprises a compound of a plurality of gamma ray lines spaced closely such that a distance between any two peak positions is smaller than a predetermined number of standard deviations.

6. The method according to claim 1, wherein the first peak is detectable in a varying background in the energy spectrum.

7. The method according to claim 1, wherein the derivative is a first order derivative, a second order derivative, or a higher order derivative.

8. The method according to claim 7, further comprising estimating a resolution of the detector based on the second order derivative.

9. The method according to claim 1, further comprising regulating the gain of the detector.

10. The method according to claim 1, further comprising:
identifying a second peak in the energy spectrum that corresponds to at least one second gamma ray line having a second characteristic energy; and
estimating an offset and a gain for the gamma-ray energy spectrum measured by the detector based on positions of the first and second peaks along the measured energy spectrum.

11. The method according to claim 10, further comprising:
identifying a third peak in the energy spectrum that corresponds to at least one third gamma ray line having a third characteristic energy; and
estimating linearity, offset and gain of energy conversion for the detector based on positions of the first, second and third peaks along the measured energy spectrum.

12. A system, comprising:
a tool comprising:
a tool structure comprising at least one element;
a neutron source that generates neutrons;
a gamma-ray detector that measures an energy spectrum of gamma rays induced by the neutrons, the energy spectrum comprising a plurality of gamma ray lines characteristic of the at least one element of the tool structure; and
a processor that receives the energy spectrum from the gamma-ray detector, selects a first peak in the energy spectrum corresponding to at least a first gamma ray line having a characteristic energy, and estimates a gain of the gamma-ray detector based on a position of the first peak along the measured energy spectrum;
wherein the processor determines the position of the first peak by calculating a derivative around the first peak, and determining the position of the first peak based on where the derivative has a predetermined value.

13. The system according to claim 12, wherein the at least one element of the tool structure comprises material selected from a group consisting of Boron-10 atoms, Iron atoms, Chromium atoms, Manganese atoms, Nickel atoms, Titanium atoms, Cobalt atoms, Aluminum atoms, and any combination thereof.

14. The system according to claim 12, wherein the derivative comprises one of a first order derivative, a second order derivative, and a higher order derivative.

15. The system according to claim 12, further comprising a controller that regulates the gain of the detector based on a difference between the estimated gain and a predefined threshold.

16. The system according to claim 12, wherein the tool structure comprises at least one of: a tool chassis, a mud channel, a collar, a shielding material, and a housing, and the element of the tool structure comprises material selected from a group consisting of Boron atoms, Iron atoms, Chromium atoms, Manganese atoms, Nickel atoms, Titanium atoms, Cobalt atoms, Aluminum atoms, and any combination thereof.

17. A method comprising:
generating neutrons;
acquiring an energy spectrum of gamma rays induced by the neutrons
identifying a first peak in the energy spectrum of gamma rays;
analyzing the first peak for relationship to a characteristic energy level associated with an elemental composition in or proximate to a gamma-ray detector;
estimating a position of the first peak along the energy spectrum by
calculating a derivative around the first peak, and
determining the position of the first peak as a function of where the derivative is equal or substantially equal to zero; and
calibrating a gain of the gamma-ray detector based on the estimated position of the first peak.

18. The method according to claim 17, wherein the derivative comprises one of a first order derivative, a second order derivative, and a higher order derivative.

19. The method according to claim 17, wherein the first peak comprises a compound of a plurality of gamma ray lines spaced closely such that a distance between any two peak positions is smaller than a predetermined number of standard deviations.

20. The method according to claim 18, wherein the first peak comprises a compound of gamma ray lines having energy levels at approximately 0.48 MeV and 0.511 MeV, and the elemental composition in or proximate to the gamma-ray detector comprises a boron shield disposed about the gamma ray detector.

21. The method according to claim 18, wherein the first peak is detectable in a varying background in the energy spectrum.

22. The method according to claim 18, wherein analyzing the first peak comprises comparing the first peak to a characteristic energy level associated with an elemental composition comprising material selected from a group consisting of Boron atoms, Iron atoms, Chromium atoms, Manganese atoms, Nickel atoms, Titanium atoms, Cobalt atoms, Aluminum atoms, and any combination thereof.

23. The method according to claim 18, further comprising performing pre-processing to subtract a background portion of the measured energy spectrum.

24. The method according to claim 18, further comprising mathematically transforming the energy spectrum prior to analyzing the first peak to reduce an error in the estimated gain due to changes in a background portion of the measured energy spectrum.

25. The method according to claim 18, further comprising repeating analyzing, estimating and calibrating at intervals in a range between one second and 60 seconds when a count rate associated with the first peak is at least a pre-determined rate.

26. The method according to claim 18, further comprising changing the gain to minimize a difference of the estimated position of the first peak and a predefined position of the first peak.

* * * * *